(12) United States Patent
Toda

(10) Patent No.: US 8,276,068 B2
(45) Date of Patent: Sep. 25, 2012

(54) INFORMATION PROCESSING APPARATUS WITH PRINT PREVIEW FUNCTION

(75) Inventor: Masanari Toda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1032 days.

(21) Appl. No.: 11/683,346

(22) Filed: Mar. 7, 2007

(65) Prior Publication Data

US 2007/0211296 A1    Sep. 13, 2007

(30) Foreign Application Priority Data

Mar. 13, 2006    (JP) ................................. 2006-068272

(51) Int. Cl.
*G06F 17/00*    (2006.01)
(52) U.S. Cl. ........................................................ 715/274
(58) Field of Classification Search .................. 715/274, 715/200
See application file for complete search history.

(56) References Cited

U.S. PATENT DOCUMENTS

| | | | | |
|---|---|---|---|---|
| 5,960,162 A * | 9/1999 | Yamamoto | ..................... | 358/1.9 |
| 5,991,783 A * | 11/1999 | Popa et al. | ..................... | 715/209 |
| 6,160,629 A | 12/2000 | Tang et al. | | |
| 6,181,436 B1 | 1/2001 | Kurachi | | |
| 6,285,461 B1 * | 9/2001 | Fujii et al. | ..................... | 358/1.18 |
| 6,556,310 B1 | 4/2003 | Livingston | | |
| 6,623,190 B1 | 9/2003 | Lutz | | |
| 6,796,730 B2 | 9/2004 | Toda et al. | | |
| 6,833,925 B1 | 12/2004 | Igoe et al. | | |
| 6,924,826 B1 | 8/2005 | Nakagiri et al. | | |
| 6,927,865 B1 | 8/2005 | Kujirai et al. | | |
| 6,963,412 B1 | 11/2005 | Toda | | |
| 7,092,111 B2 * | 8/2006 | Nishikawa et al. | ............ | 358/1.1 |
| 7,161,702 B2 | 1/2007 | Toda | | |
| 7,464,335 B2 * | 12/2008 | Nakagiri et al. | ............... | 715/700 |
| 7,584,242 B2 * | 9/2009 | Ebuchi | ......................... | 709/203 |
| 2001/0056449 A1 * | 12/2001 | Kawamoto et al. | ........... | 707/527 |
| 2002/0026453 A1 * | 2/2002 | Mori et al. | ................... | 707/104.1 |
| 2002/0042798 A1 * | 4/2002 | Takei et al. | ................... | 707/500 |
| 2002/0078101 A1 * | 6/2002 | Chang et al. | .................. | 707/523 |
| 2002/0085230 A1 * | 7/2002 | Kitahara et al. | ............. | 358/1.16 |
| 2003/0002056 A1 * | 1/2003 | Yamaguchi et al. | ........... | 358/1.2 |

(Continued)

FOREIGN PATENT DOCUMENTS

CN            1538285           10/2004

(Continued)

OTHER PUBLICATIONS

Terry et al., Recognizing Creative Needs in User Inteface Design, ACM 2002, pp. 38-44.*

(Continued)

*Primary Examiner* — Cong-Lac Huynh
(74) *Attorney, Agent, or Firm* — Fitzpatrick, Cella, Harper & Scinto

(57) ABSTRACT

In a print system of this invention, upon issuance of a preview instruction from an application (201), print data is spooled in a spool file (303). A printer driver (203) despools the spooled data and transmits the despooled data to a printer (2000) as a preview job together with job setting information. The printer (2000) generates preview information for each physical page in accordance with the job setting information, and sends it to a host computer (3000). A previewer (306) receives the preview information, reads out data from a spooler, and displays a preview image in accordance with the received preview information.

15 Claims, 20 Drawing Sheets

U.S. PATENT DOCUMENTS

| | | | |
|---|---|---|---|
| 2003/0002063 A1 | 1/2003 | Oomura et al. | |
| 2003/0030846 A1* | 2/2003 | Mori et al. | 358/400 |
| 2003/0038959 A1* | 2/2003 | Kuroi | 358/1.11 |
| 2003/0098987 A1 | 5/2003 | Fiske | |
| 2003/0103221 A1 | 6/2003 | Natori | |
| 2003/0142325 A1 | 7/2003 | Leslie | |
| 2004/0021905 A1 | 2/2004 | Holmstead et al. | |
| 2004/0125407 A1* | 7/2004 | Nishikawa et al. | 358/1.18 |
| 2004/0190057 A1 | 9/2004 | Takahashi et al. | |
| 2004/0207859 A1 | 10/2004 | Kadoi et al. | |
| 2005/0010860 A1* | 1/2005 | Weiss et al. | 715/500.1 |
| 2005/0030334 A1* | 2/2005 | Kai et al. | 347/19 |
| 2005/0060639 A1* | 3/2005 | Furukawa et al. | 715/500 |
| 2005/0076298 A1 | 4/2005 | Lutz | |
| 2005/0114767 A1* | 5/2005 | Sato | 715/527 |
| 2005/0206953 A1* | 9/2005 | Kujirai et al. | 358/1.15 |
| 2005/0243371 A1* | 11/2005 | Kanaya et al. | 358/1.18 |
| 2005/0283721 A1* | 12/2005 | Warmus et al. | 715/517 |
| 2005/0286100 A1* | 12/2005 | Uotani et al. | 358/527 |
| 2006/0066899 A1* | 3/2006 | Yoshida | 358/1.15 |
| 2006/0152758 A1* | 7/2006 | Owen | 358/1.15 |
| 2006/0168520 A1* | 7/2006 | Lapstun et al. | 715/527 |
| 2006/0221085 A1* | 10/2006 | Yamada | 345/501 |
| 2007/0057978 A1* | 3/2007 | Hagiwara | 347/5 |
| 2007/0113164 A1* | 5/2007 | Hansen et al. | 715/500 |
| 2007/0121144 A1* | 5/2007 | Kato | 358/1.14 |
| 2007/0127055 A1* | 6/2007 | Kujirai et al. | 358/1.14 |
| 2007/0211276 A1 | 9/2007 | Toda | |
| 2007/0211296 A1 | 9/2007 | Toda | |
| 2007/0240042 A1 | 10/2007 | Sato | |
| 2008/0151282 A1* | 6/2008 | Natori | 358/1.9 |
| 2008/0267512 A1* | 10/2008 | Austin et al. | 382/219 |
| 2008/0301549 A1* | 12/2008 | Czudak | 715/274 |
| 2009/0009552 A1* | 1/2009 | Aritomi | 347/19 |
| 2010/0046048 A1* | 2/2010 | Uotani et al. | 358/527 |
| 2010/0064211 A1* | 3/2010 | Kujirai et al. | 715/274 |
| 2011/0249294 A1* | 10/2011 | Aritomi et al. | 358/1.15 |
| 2011/0261377 A1* | 10/2011 | Kujirai et al. | 358/1.9 |
| 2011/0310426 A1* | 12/2011 | Kujirai et al. | 358/1.14 |

FOREIGN PATENT DOCUMENTS

| | | |
|---|---|---|
| EP | 0933692 A | 4/1999 |
| EP | 1526442 A2 | 4/2005 |
| JP | 8030410 | 2/1996 |
| JP | 2001067347 | 3/2001 |
| JP | 2001-134407 A | 5/2001 |
| JP | 2002-196901 A | 7/2002 |
| JP | 2003-162396 A | 6/2003 |
| JP | 2003-167721 | 6/2003 |
| JP | 2004-164169 A | 6/2004 |
| JP | 2005-070862 | 3/2005 |

OTHER PUBLICATIONS

Evans, PostScript vs. PDF, Google 2000, pp. 1-4.*
Japanese Office Action dated Dec. 3, 2010 concerning Japanese Patent Application No. 2006-068272.
Office Action, dated Sep. 5, 2008, in KR 10-2007-0024615.
Office Action, dated Sep. 12, 2008, in CN 200710005689.7.
Office Action dated Feb. 15, 2011 concerning U.S. Appl. No. 11/683,320, filed Mar. 7, 2007, which is not currently being submitted herewith as the Office Action is of record in U.S. Appl. No. 11/683,320.
European Search Report dated Mar. 27, 2012 in corresponding European Patent Application No. 07103494.6.

* cited by examiner

FIG. 3
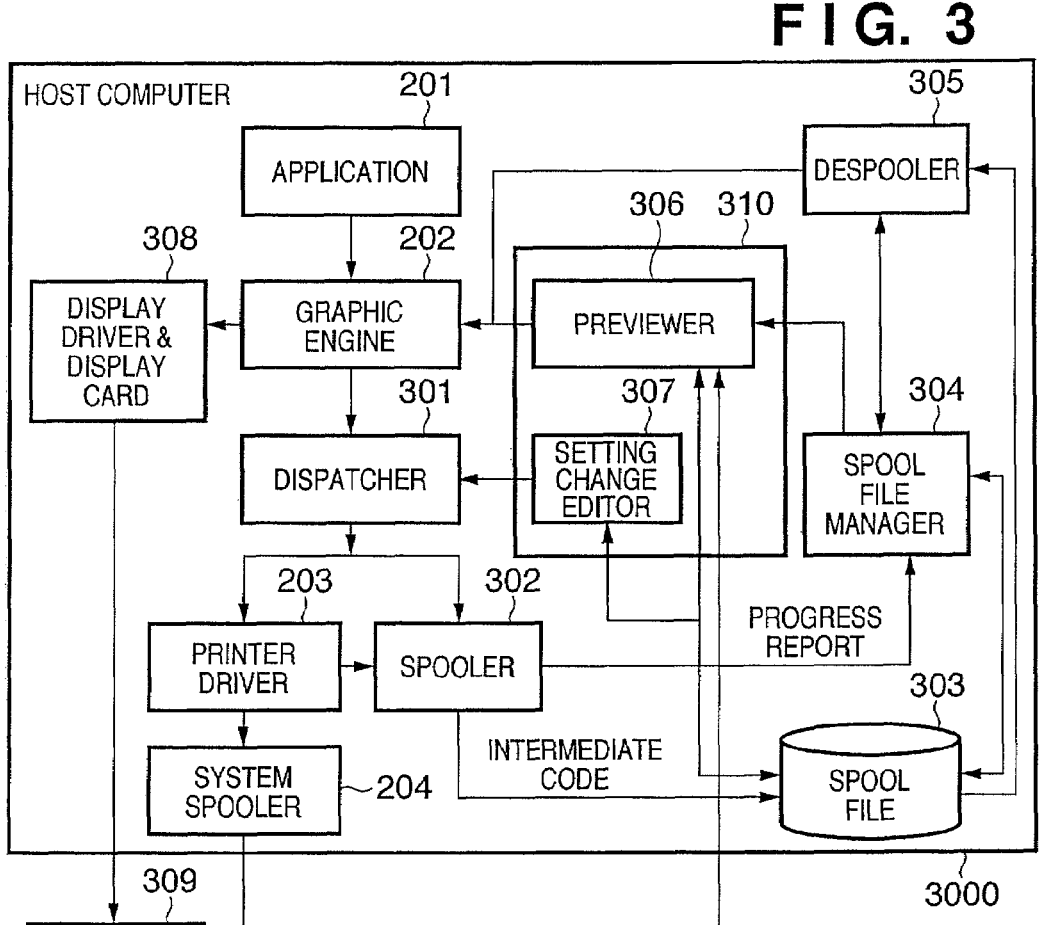
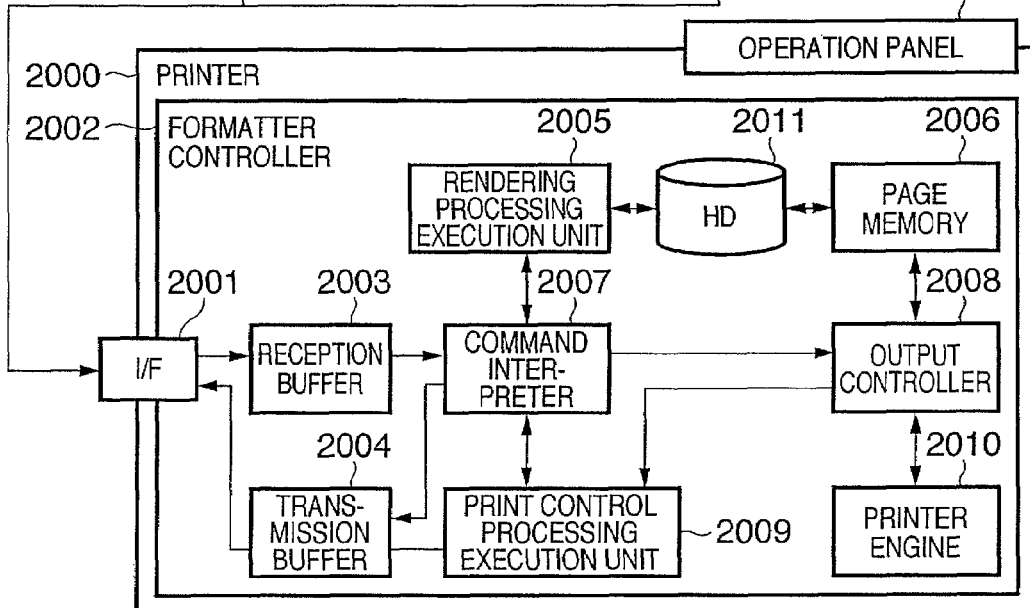

FIG. 10

PREVIEW INFORMATION
2-UP DOUBLE-SIDED PATTERN (1)         1001

```
JOB TYPE              : PREVIEW INFORMATION (JDFP)
JOB NAME              : JOB1
OUTPUT PAPER SIZE     : A3
PAGE LAYOUT           : 2-up
PAPER PORT            : CASSETTE 1
EXHAUST DESTINATION   : TRAY(A)
FINISHING METHOD      : UPPER LEFT STAPLING
DOUBLE-SIDED          : ON
COLOR MODE            : AUTO COLOR
BLANK PAGE SAVING     : ON
[PHYSICAL PAGE INFORMATION]
PageNo                : 1-OBVERSE
 FINISHING METHOD     : UPPER LEFT STAPLING
 BLANK PAGE DETERMINATION : FALSE
 ACCOUNTING DETERMINATION : COLOR
 CONFIGURING LOGICAL PAGES
                      : L1(A4, 0°, EQUAL SCALE, (x1, y1))
                      : L2(A4, 0°, EQUAL SCALE, (x2, y1))
PageNo                : 1-REVERSE
 FINISHING METHOD     : UPPER RIGHT STAPLING (LOGICAL POSITION)
 BLANK PAGE DETERMINATION : FALSE
 ACCOUNTING DETERMINATION : COLOR
 CONFIGURING LOGICAL PAGES
                      : L3(A5, 0°, ENLARGE TO A4 WIDTH, (x1, y1))
                      : L4(A4 LANDSCAPE, 90°, EQUAL SCALE, (x2, y1))
PageNo                : 2-OBVERSE
 FINISHING METHOD     : UPPER LEFT STAPLING
 BLANK PAGE DETERMINATION : FALSE
 ACCOUNTING DETERMINATION : MONO
 CONFIGURING LOGICAL PAGES
                      : L5(A4 LANDSCAPE, 0°, EQUAL SCALE, (x1, y1))
PageNo                : 2-REVERSE
 FINISHING METHOD     : UPPER RIGHT STAPLING (LOGICAL POSITION)
 BLANK PAGE DETERMINATION : TRUE
 ACCOUNTING DETERMINATION : FREE
 CONFIGURING LOGICAL PAGES : NONE
```

1010 brackets the CONFIGURING LOGICAL PAGES entries.

1002: aa | (blank)  — L1  L2
1003: BAT | Text page 4  — L3  L4
1004: Text page 5 | (blank)  — L5
1005: (blank) | (blank)

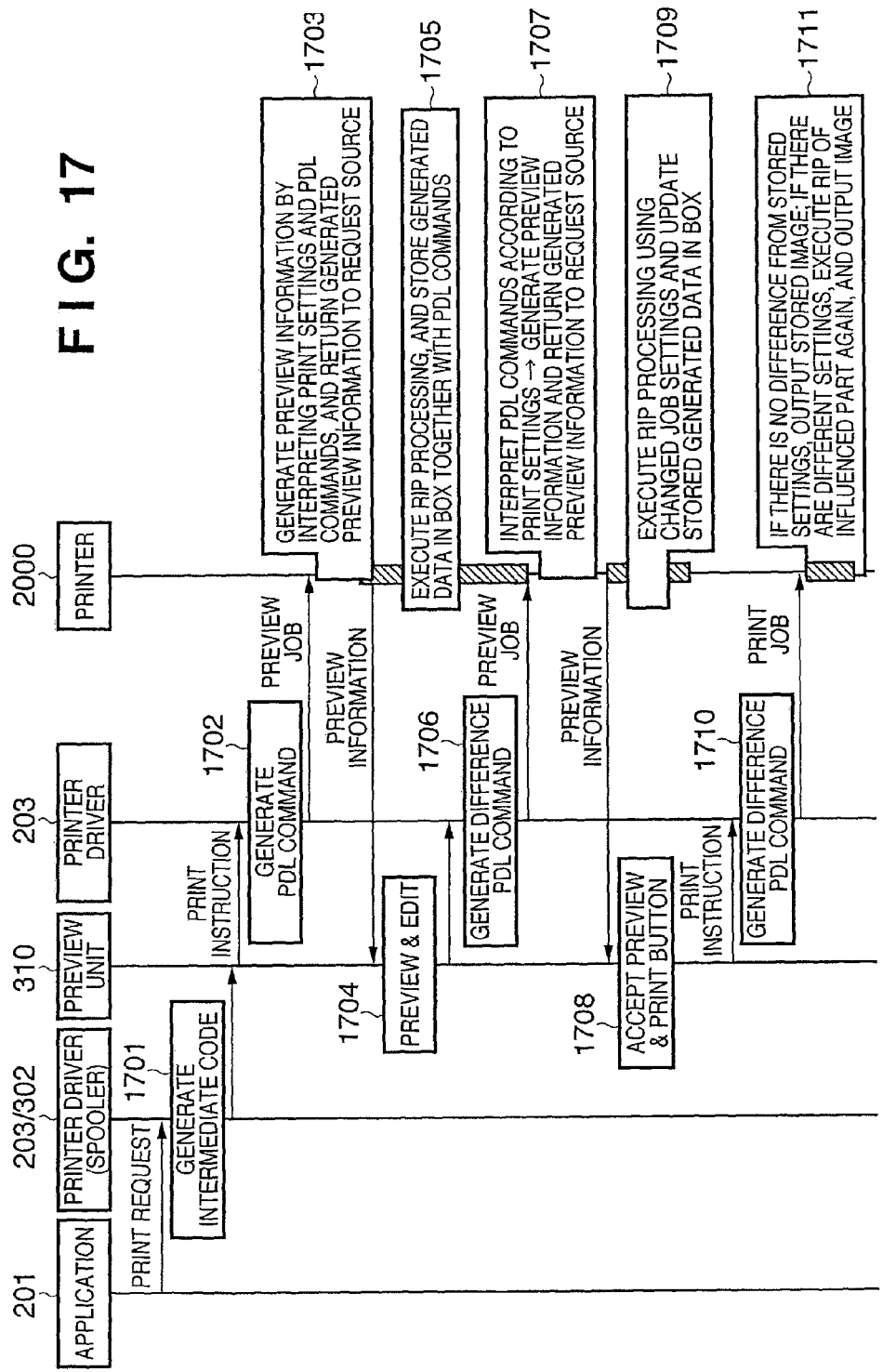

FIG. 18

PRINT INSTRUCTION
  JOB SETTING INFORMATION                   1801

| | |
|---|---|
| JOB TYPE | : EXECUTE PRINT |
| JOB NAME | : JOB1 |
| OUTPUT PAPER SIZE | : A3 |
| PAGE LAYOUT | : 2-up |
| PAPER PORT | : CASSETTE 1 |
| EXHAUST DESTINATION | : TRAY(A) |
| FINISHING METHOD | : UPPER LEFT STAPLING |
| DOUBLE-SIDED | : ON |
| COLOR MODE | : AUTO COLOR |
| BLANK PAGE SAVING | : ON |
| [PHYSICAL PAGE INFORMATION] | |
| PageNo | : 1-REVERSE |
|   FINISHING METHOD | : UPPER LEFT STAPLING |
|   BLANK PAGE DETERMINATION | : FALSE |
|   ACCOUNTING DETERMINATION | : COLOR |
|   CONFIGURING LOGICAL PAGES | |
| | : L4 (A4 LANDSCAPE, 180°, EQUAL SCALE, (x1,y2)) |
| | : L3 (A5 PORTRAIT, 270°, EQUAL SCALE, (x2,y2)) |

FIG. 19

| | | 1901 |
|---|---|---|
| JOB TYPE | : CANCEL PRINT | |
| JOB NAME | : JOB1 | |

INFORMATION PROCESSING APPARATUS WITH PRINT PREVIEW FUNCTION

BACKGROUND OF THE INVENTION

1. Field of the Invention

The present invention relates to, for example, an information processing apparatus such as a personal computer or the like which transmits print data to a printer and, more particularly, to an information processing apparatus which displays a preview based on print data at the time of a print instruction.

2. Description of the Related Art

Conventionally, a preview scheme that displays a print result on an information processing apparatus such as a host computer or the like before execution of printing roughly includes two schemes.

In one preview scheme, an information processing apparatus generates and displays a preview image by simulating processing to be executed by a printer so as to allow the user to confirm a finishing result upon using a function such as stapling or the like (for example, see Japanese Patent Laid-Open No. 2001-67347).

In the other preview scheme, an information processing apparatus sends print instructions to a printer, the printer sends back image data which has undergone RIP processing (rasterize processing) to a host, and the host displays the image data (for example, see Japanese Patent Laid-Open No. 08-030410).

Some printers as computer peripheral devices support a Print On Demand (to be abbreviated as POD hereinafter) service, and have advanced functions such as complete bookbinding. Upon using printers with advanced functions, plural pieces of information associated with print results such as a finishing result, color determination result, blank page determination result, and the like that the user should know before actual printing are complicated, and functions which do not allow for mistakes are increasing. Since these pieces of information are different for respective printers, respective print instructions, and respective pages, it becomes difficult for a computer to completely simulate them.

SUMMARY OF THE INVENTION

The present invention has been made in consideration of the above prior art, and provides an information processing apparatus and program, which can implement an accurate preview display that reflects processes to be executed by a multi-functional printer even when the multi-functional printer is used in printing. The present invention also provides an information processing apparatus and program, which allow the user to change print settings while displaying a preview window, and can accurately reflect the changes of the print settings on a preview and printouts.

The present invention provides an information processing apparatus connected to a printer which generates preview information that indicates layouts and finishing processing for respective physical pages in accordance with received printer control commands, comprising:

a print instruction transmission unit adapted to generate, when a preview designation of data is issued, printer control commands according to print data together with a job type indicating preview, and transmit the generated printer control commands to the printer; and a preview unit adapted to generate and display a preview image based on preview information which is generated by the printer in accordance with the printer control commands and indicates layouts and finishing processing for respective physical pages.

The present invention also provides a printer system formed by connecting an information processing apparatus and a printer which generates preview information indicating layouts and finishing processing for respective physical pages in accordance with received printer control commands, the information processing apparatus comprising a print instruction transmission unit adapted to generate, when a preview designation of data is issued, printer control commands according to print data together with a job type indicating preview, and transmit the generated printer control commands to the printer, and a preview unit adapted to generate and display a preview image based on preview information which is generated by the printer in accordance with the printer control commands and indicates layouts and finishing processing for respective physical pages; and the printer comprising a reception unit adapted to receive the printer control commands from the information processing apparatus, a preview information generation unit adapted to generate, when the job type corresponding to the printer control commands is preview, preview information which indicates layouts of logical pages and finishing processing for respective physical pages to be printed in accordance with job control information and print data included in the printer control commands, and a transmission unit adapted to transmit the preview information to the information processing apparatus.

Alternatively, the present invention also provides an information processing apparatus comprising:

a print instruction transmission unit adapted to generate, when a preview designation is issued, printer control commands according to print data together with a job type indicating preview, and transmit the generated printer control commands to a printer; and a preview unit adapted to generate and display a preview image based on preview information which is generated by the printer in accordance with the printer control commands and indicates sizes, orientations, and scaling information of pages to be laid out.

The present invention can implement an accurate preview display that reflects the states of output materials by the printer. The present invention allows the user to change print settings while displaying a preview window, and can accurately reflect the changes of the print settings on a preview and printouts.

Further features of the present invention will become apparent from the following description of exemplary embodiments with reference to the attached drawings.

BRIEF DESCRIPTION OF THE DRAWINGS

FIG. 3 is a block diagram showing the arrangement of a print system which temporarily spools an intermediate code before it converts print instructions from an application into printer control commands;

FIG. 10 shows an example of preview information (JDFP);

FIG. 17 is a chart showing the flow of the overall preview processing system according to the present invention;

FIG. 18 shows an example of a print instruction job; and

FIG. 19 shows an example of a print cancel job.

DESCRIPTION OF THE EMBODIMENTS

Figure 1:
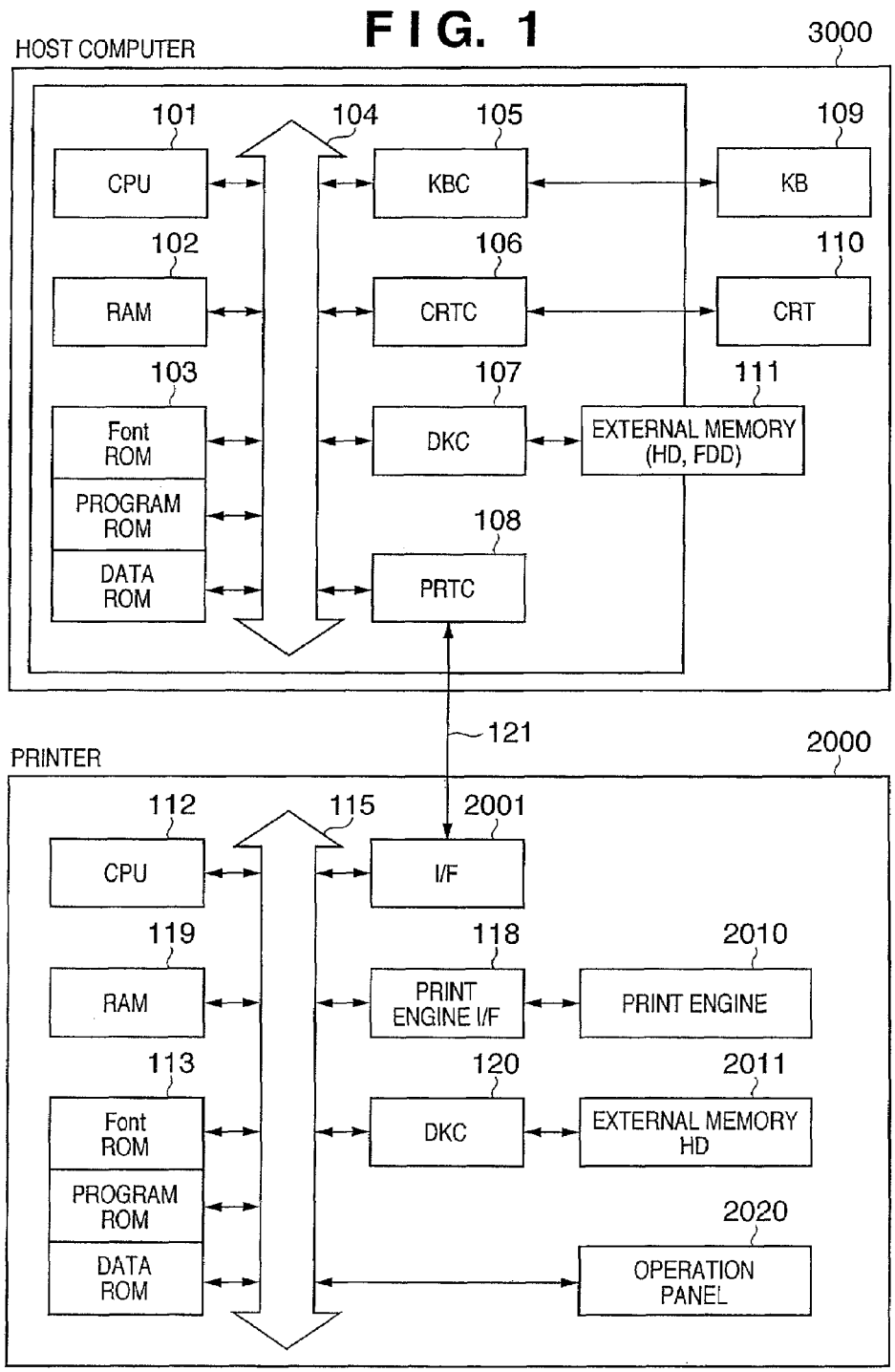
FIG. 1 is a block diagram for explaining the arrangement of a print control apparatus according to one embodiment of the present invention.

Embodiments to which the present invention can be suitably applied will be described hereinafter. FIG. 1 is a block diagram showing the arrangement of a printer control system according to one embodiment of the present invention. Note that the present invention can be applied to any of a standalone device, a system including a plurality of devices, and a system in which devices are connected via a network such as a LAN, WAN, or the like to execute processing, as long as the functions of the present invention can be implemented.

Referring to FIG. 1, a host computer 3000 comprises a CPU 101. The CPU 101 systematically controls respective devices connected to a system bus 104. The CPU 101 controls document processing, print processing, and the like of documents that include any combinations of graphics data, image data, text data, table data (including a spreadsheet), and the like together, based on a document processing program and the like stored in a program ROM of a ROM 103 or an external memory 111. The program ROM of the ROM 103 or the external memory 111 stores an operating system program (to be referred to as an OS hereinafter), and programs of the procedures shown in FIGS. 5, 6, 7, and 14. A font ROM of the ROM 103 or the external memory 111 stores font data and the like used in the document processing. A data ROM of the ROM 103 or the external memory 111 stores various data used upon executing the document processing and the like. A RAM 102 serves as a main memory, work area, and the like of the CPU 101.

A keyboard controller (KBC) 105 controls key inputs from a keyboard 109 and a pointing device (not shown). A CRT controller (CRTC) 106 controls a display on a CRT display (CRT) 110. A disk controller (DKC) 107 controls access to the external memory 111 such as a hard disk (HD), flexible disk (FD), or the like. The external memory 111 such as the hard disk or the like stores programs and data such as a boot program, various applications, font data, user files, edit files, a printer control command (or to be referred to as a PDL command) generation program (to be referred to as a printer driver hereinafter), and the like. A printer controller (PRTC) 108 is connected to a printer 2000 via a network 121, and executes communication control processing with the printer 2000. The printer (printing apparatus) 2000 is often connected to a network such as Ethernet® or the like.

Note that the CPU 101 executes rasterize processing of a print preview image on a display information RAM assured on, e.g., the RAM 102 to display a preview on the CRT 110. The CPU 101 opens various registered windows based on commands instructed by a mouse cursor or the like (not shown) on the CRT 110, and executes various kinds of data processing in accordance with operations by the operator. Upon execution of printing, the user opens a window associated with print settings, and can set a printer and a print processing method for a printer driver as well as selection of a print mode. The user can also call and display the window for the print settings (also called print attributes) from a preview display window, and can change the settings from the windows for the print settings. In this embodiment, various settings for printing are called print settings, and information including the print settings together is called print setting information. The print setting information is, for example, a structure called DEVMODE in Windows®. The print setting information is changed by the printer driver, is passed to a spooler for each print job, and is saved as the print settings of that job. This information which is stored in the spooler and indicates the print settings for each job is called job setting information.

A printer CPU 112 controls the printer 2000. The printer CPU 112 outputs an image signal as output information to a printer engine 2010 connected to a system bus 115 via a printer engine interface 118 based on control programs and the like stored in a program ROM of a ROM 113 or an external memory 2011. The program ROM of the ROM 113 stores control programs and the like of the CPU 112. A font ROM of the ROM 113 stores font data and the like used upon generating the output information. A data ROM of the ROM 113 stores information and the like used on the host computer in case of a printer which has no external memory 2011 such as a hard disk or the like.

The printer CPU 112 can execute communication processing with the host computer via an interface unit 2001, and can send information and the like in the printer to the host computer 3000. A RAM 119 serves as a main memory, work area, and the like of the printer CPU 112, and can expand its memory capacity by an optional RAM connected to an expansion port (not shown). Note that the RAM 119 can also be used as an output information rasterize area, environmental data storage area, NVRAM, and the like. A disk controller (DKC) 120 controls access to the external memory 2011 such as a hard disk (HD), IC card, or the like. The external memory 2011 is connected as an option; and stores font data, emulation programs, form data, and the like. On the operation panel 2020, switches, LED indicators, and the like used to operate the printer are arranged. The printer CPU 112 executes the program of the procedure shown in FIGS. 15A and 15B, and rasterizes print data received from the computer 3000 to print it on a paper sheet. In case of a preview job, the printer CPU 112 generates preview information which reflects layouts and the like for respective pages, and finishing processing based on the job setting information received from the computer 3000, and transmits the generated preview information to the computer 3000.

The number of external memories 2011 is not limited to one, and a plurality of external memories may be connected. A plurality of external memories including an optional font card in addition to built-in font data, an external memory which stores a program that interprets a printer control language of a different language system, and the like may be connected. Furthermore, the printer may comprise an NVRAM (not shown), and may store printer mode setting information from an operation panel 2020.

<Arrangement of Printer>

Figure 4:
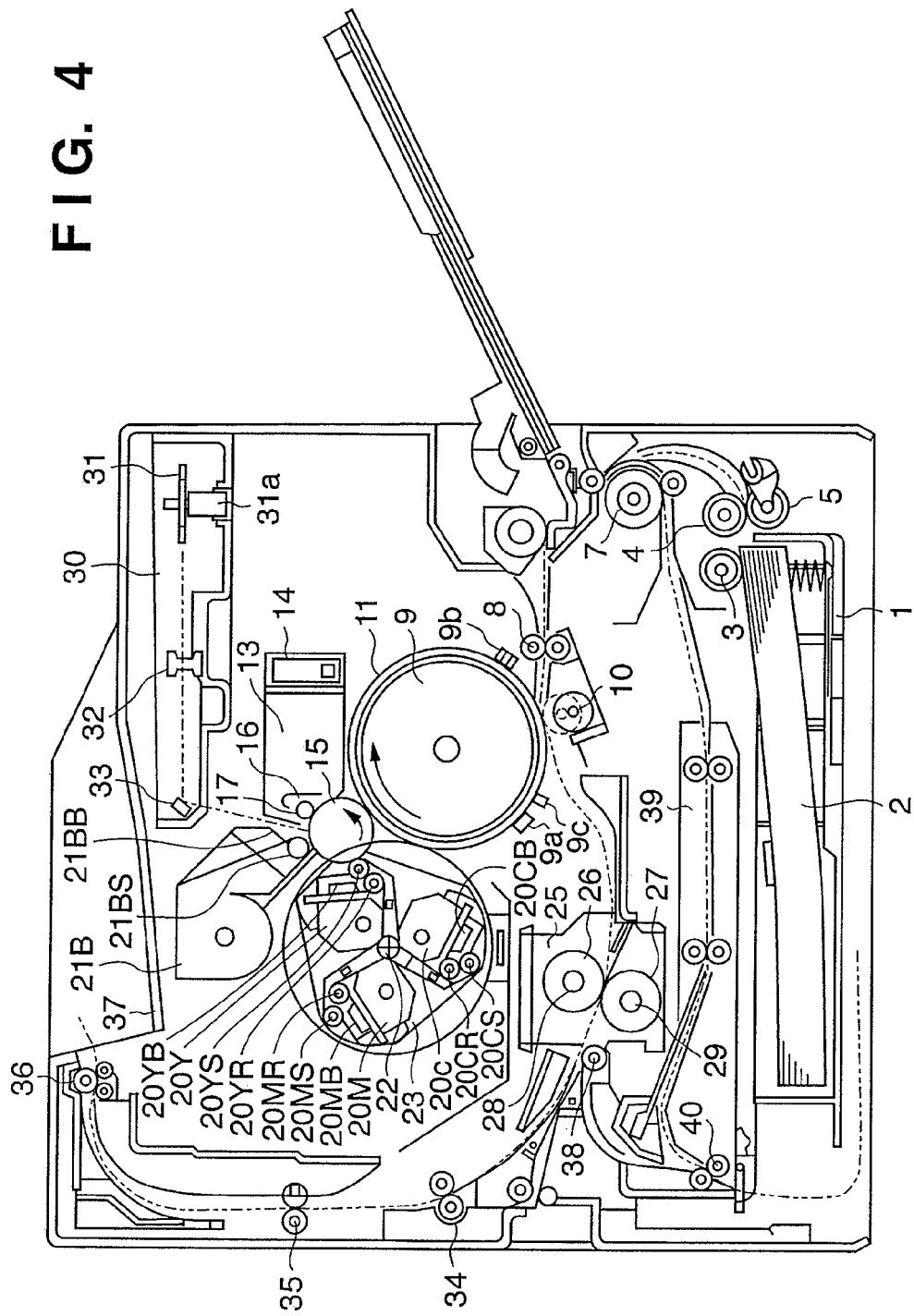
FIG. 4 is a sectional view for explaining a printer according to the present invention.

FIG. 4 is a sectional view of a color laser beam printer which has a double-sided print function, as an example of the printer 2000. The printer 2000 scans, via a polygon mirror 31, a photosensitive drum 15 with a laser beam, which is modulated by image data for each color obtained based on print data input from the host computer 3000, thus forming an electrostatic latent image. The printer 2000 develops this electrostatic image by each toner to obtain a visible image of a given color, and multiple-transfers visible images for all the colors onto an intermediate transfer member 9, thus forming a color visible image. Furthermore, the printer 2000 transfers this color visible image onto a transfer material (e.g., a sheet of paper) 2, and fixes the color visible image on the transfer material 2. An image forming unit which makes the aforementioned control comprises a drum unit having the photosensitive drum 15, a primary charger having a contact charger roller 17, a cleaning unit, a developing unit, the intermediate transfer member 9, a paper feed unit including a paper cassette 1 and various rollers 3, 4, 5, and 7, a transfer unit including a transfer roller 10, and a fixing unit 25.

A drum unit 13 is configured by integrating the photosensitive drum (photosensitive body) 15 and a cleaner container 14 which also serves as a holder of the photosensitive drum 15 and has a cleaning mechanism. This drum unit 13 is detachably supported by a printer main body, and is easily exchanged by another unit in correspondence with the service life of the photosensitive drum 15. The photosensitive drum 15 is formed by applying an organic photoconductor layer on the outer circumferential surface of an aluminum cylinder, and is rotatably supported by the cleaner container 14. The photosensitive drum 15 is rotated by the driving force transmitted from a drive motor (not shown), which rotates the photosensitive drum 15 counterclockwise in correspondence with the image forming operation. An electrostatic latent image is formed by selectively exposing the surface of the photosensitive drum 15. In a scanner unit 30, a modulated laser beam is reflected by the polygon mirror 31, which rotates in synchronism with a horizontal sync signal of an image signal by a motor 31*a*, and strikes the photosensitive drum via a lens 32 and reflecting mirror 33.

The developing unit has an arrangement comprising three color developers 20Y, 20M, and 20C used to develop yellow (Y), magenta (M), and cyan (C), and one black developer 21B used to develop black, so as to visualize the electrostatic latent image. The color developers 20Y, 20M, and 20C and the black developer 21B respectively comprise sleeves 20YS, 20MS, and 20CS, and 21BS, and application blades 20YB, 20MB, 20CB, and 21BB, which are respectively in press contact with the outer circumferential surfaces of these sleeves 20YS, 20MS, and 20CS, and 21BS. The three color developers 20Y, 20M, and 20C respectively have application rollers 20YR, 20MR, and 20CR.

The black developer 21B is detachably attached to the printer main body, and the color developers 20Y, 20M, and 20C are detachably attached to a developing rotary 23, which rotates about a rotation shaft 22. The sleeve 21BS of the black developer 21B is located to have a small gap of about 300 μm from the photosensitive drum 15. The black developer 21B feeds toner using a built-in feeding member, and gives an electric charge to the toner by frictional electrification so as to apply the toner on the outer circumferential surface of the sleeve 21BS, which rotates clockwise, using the application blade 21BB. By applying a developing bias to the sleeve 21BS, an electrostatic latent image on the photosensitive drum 15 is developed by black toner to form a visible image on the photosensitive drum 15.

The three color developers 20Y, 20M, and 20C rotate upon rotation of the developing rotary 23 in image formation, and the predetermined sleeve 20YS, 20MS, or 20CS opposes the photosensitive drum 15 to have a small gap of about 300 μm. In this way, the predetermined color developer 20Y, 20M, or 20C stops at a developing position that opposes the photosensitive drum 15, thus forming a visible image on the photosensitive drum 15.

Upon forming a color image, the developing rotary 23 rotates upon completion of a color developing process for a component color on the intermediate transfer member 9. The developing processes are done in the order of the yellow developer 20Y, magenta developer 20M, cyan developer 20C, and black developer 21B. After four rotations of the intermediate transfer member 9, visible images of yellow, magenta, cyan, and black toners are sequentially formed, thus consequently forming a full-color visible image on the intermediate transfer member 9.

The intermediate transfer member 9 contacts the photosensitive drum 15, and rotates upon rotation of the photosensitive drum 15. The intermediate transfer member 9 rotates clockwise and receives four visible images multiple-transferred from the photosensitive drum 15 upon color image formation. Also, the transfer roller 10 (to be described later) contacts the intermediate transfer member 9 to clamp and convey the transfer material 2 upon image formation, thus simultaneously multiple-transferring the color visible image on the intermediate transfer member 9 onto the transfer material 2. A TOP sensor 9*a* and RS sensor 9*b* used to detect the positions associated with the rotation direction of the intermediate transfer member 9, and a density sensor 9*c* used to detect the density of a toner image transferred onto the intermediate transfer member are located around the intermediate transfer member.

The transfer roller 10 comprises a transfer charger supported to be movable toward or away from the intermediate transfer member 9. The transfer roller 10 is formed by warping a medium resistance foamed elastic body on a metal shaft.

The transfer roller 10 moves away downward so as not to disturb color visible images while the color visible images are multiple-transferred onto the intermediate transfer member 9, as indicated by the solid line in FIG. 4. After the four color visible images are formed on the intermediate transfer member 9, the transfer roller 10 is located at an upper position indicated by the dotted line in FIG. 4 by a cam member (not shown) in synchronism with the transfer timing of the multi-color visible image onto the transfer material 2. In this way, the transfer roller 10 is brought into press contact with the intermediate transfer member 9 at a predetermined pressure via the transfer material 2, and is applied with a bias voltage, thus transferring the multi-color visible image onto the transfer material 2.

The fixing unit 25 fixes the transferred multi-color visible image while conveying the transfer material 2, and comprises a fixing roller 26 which heats the transfer material 2, and a pressure roller 27 which makes the transfer material 2 pressure-contact the fixing roller 27. The fixing roller 26 and pressure roller 27 have a hollow shape, and respectively incorporate heaters 28 and 29. That is, the transfer material 2 which holds the multi-color visible image is conveyed and applied with heat and pressure by the fixing roller 26 and pressure roller 27, thus fixing the toner image on its surface.

After the visible image is fixed, the transfer material 2 is exhausted onto an exhaust unit 37 by exhaust rollers 34, 35, and 36, thus ending the image forming operation.

The cleaning unit cleans the residual toner on the photosensitive drum 15 and intermediate transfer member 9, and the cleaner container 14 stores waste toner after the toner visible image formed on the photosensitive drum 15 is transferred onto the intermediate transfer member 9 or after the four color visible images formed on the intermediate transfer member 9 are transferred onto the transfer material 2.

A transfer material (print sheet) 2 to be printed is picked up from the paper cassette 1 by a pickup roller 3, and is conveyed while being clamped between the intermediate transfer member 9 and transfer roller 10. Then, a color toner image is transferred to the transfer material 2, and is fixed via the fixing unit 25. In a single-sided print mode, a guide 38 forms a conveyance path to guide the print sheet to the exhaust unit at an upper position. However, in a double-sided print mode, the guide 38 forms a path to guide the print sheet to a double-sided unit at a lower position.

The print sheet guided to the double-sided unit is temporary fed to a portion under the paper cassette 1 (a convey path indicated by the two-dashed chain line) by convey rollers 40, and is then conveyed in a reverse direction to be fed to a double-sided tray 39. On the double-sided tray 39, the obverse and reverse faces of the print sheet are reversed from those placed on the paper cassette 11, and the leading and trailing ends of the convey direction are reversed. In this state, by transferring and fixing toner images again, the double-sided print mode can be attained.

<Software Configuration of Host Computer>

Figure 2:
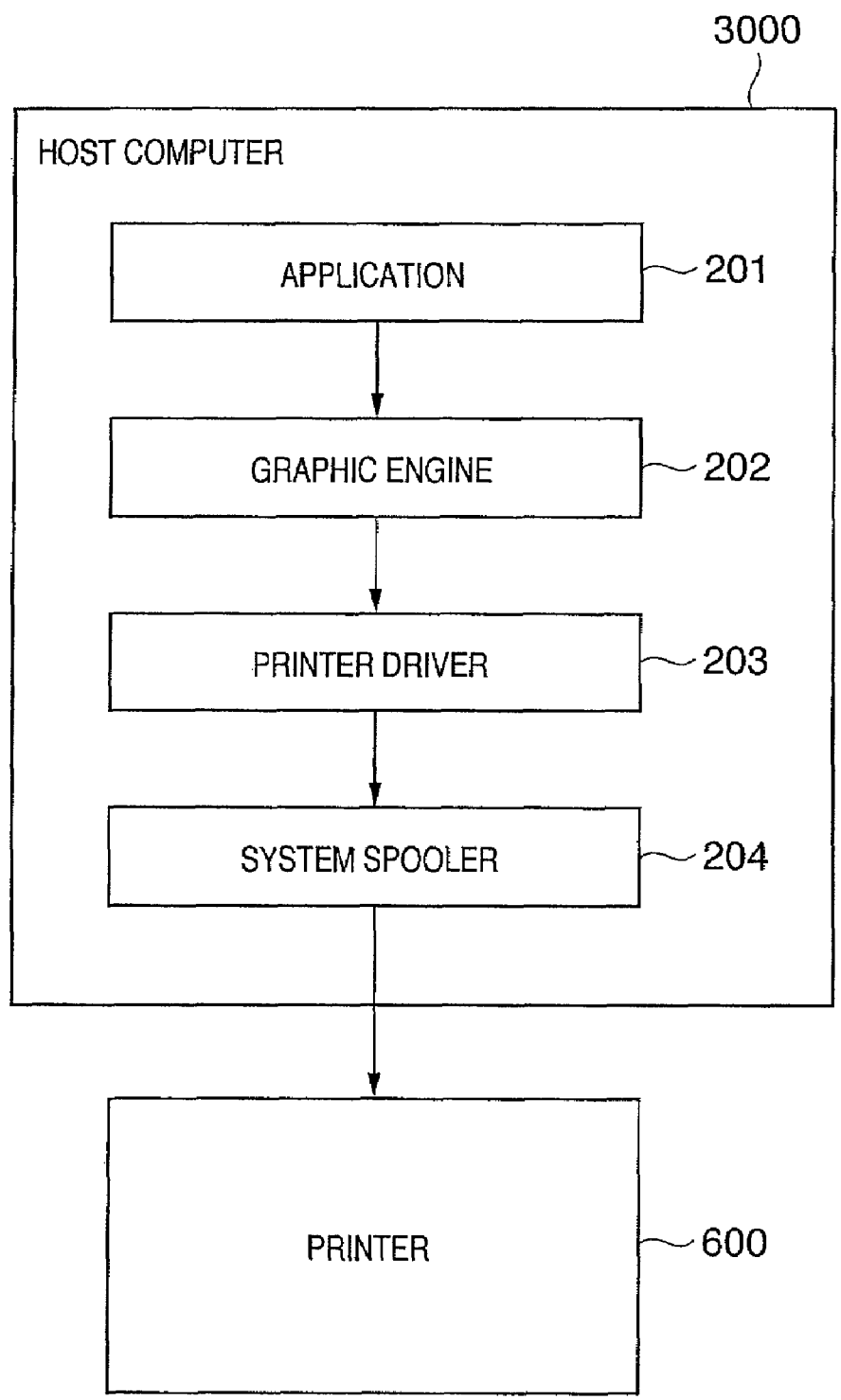
FIG. 2 is a block diagram showing the arrangement of a typical print system of a host computer to which a printer is connected.

FIG. 2 shows the configuration of typical print processing in the host computer to which the printing apparatus such as a printer or the like is connected directly or via a network. An application 201, graphic engine 202, printer driver 203, and system spooler 204 exist as files saved in the external memory 111. These files are executed after they are loaded onto the RAM 102 by the OS or modules that use those of the OS. The application 201 and printer driver 203 can be added to the HD of the external memory 111 via the FD or a CD-ROM (not shown) of the external memory 111, or a network (not shown). However, when print processing is executed from the application 201 to the printer 2000, the application 201 outputs rendering data using the graphic engine 202 which is similarly loaded onto the RAM 102 and is ready to run. Note that the following explanation will be given using the Windows® OS available from Microsoft Corporation. In Windows®, the graphic engine 202 as rendering means of the OS is generally called a GDI (Graphic Device Interface), and the application outputs rendering data called GDI functions to the GDI serving as the graphic engine.

The graphic engine 202 similarly loads onto the RAM 102 the printer driver 203, which is prepared for each printing apparatus, from the external memory 111. The graphic engine 202 then converts the GDI functions output from the application 201 into DDI (Device Driver Interface) functions based on a library and outputs the DDI functions to the printer driver 203. The printer driver 203 converts the DDI functions received from the graphic engine 202 into control commands that can be recognized by the printer, e.g., PDL (Page Description Language) commands. The converted PDL commands are output to the printer 2000 as print data included in a print job via the system spooler 204, which is loaded onto the RAM 102 by the OS, and the interface 121. The preview print system proposed by Japanese Patent Laid-Open No. 2001-067347 is implemented by providing a configuration that temporarily spools print data from the application as intermediate code data in addition to the print system which includes the printer and host computer shown in FIG. 2.

A preview print system of this embodiment will be described below using FIG. 3. FIG. 3 shows a system obtained by enhancing that shown in FIG. 2, and adopts a configuration that temporarily generates a spool file 303 including intermediate codes upon sending print instructions from the graphic engine 202 as the rendering means of the OS to the printer driver 203. Since intermediate codes are temporarily generated, a previewer loads the contents of the intermediate codes of the spool file 303 and allows the user to preview and to change the print settings.

For these purposes, the system shown in FIG. 2 is enhanced to spool as intermediate code data, as shown in FIG. 3. In order to change the settings of print data, the user normally makes settings from a window provided by the printer driver 203, which saves the setting contents on the RAM 102 or external memory 111.

<Software Configuration of Host Computer of this Embodiment>

Details of FIG. 3 will be described below. The same reference numerals in FIG. 3 denote the same blocks as those in FIG. 2. As shown in FIG. 3, in this enhanced processing system, a dispatcher 301 receives print instructions output from the graphic engine 202. If the print instructions (DDI functions) received from the graphic engine 202 are those (GDI functions) issued from the application 201, the dispatcher 301 loads the spooler 302 stored in the external memory 111 onto the RAM 102. Also, the dispatcher 301 sends the received print instructions (GDI functions) to the spooler 302 in place of the printer driver. In order to allow the dispatcher 301 to determine the source of print instructions, a method of appending an ID of a process as a transmission source of print instructions to those print instructions or the like is available.

The spooler 302 interprets the received print instructions, converts them into intermediate codes in a predetermined format, which allows easy modifications, for respective pages, and outputs the converted intermediate codes to store them in the spool file 303. The spool file of the intermediate codes stored for each page is called a page rendering file (or Unified Display List: UDL). The spooler 302 acquires print setting information set using the printer driver 203 from it, and saves the acquired print setting information in the spool file 303 as a setting file for each job. The print setting file stored for each job is called a job setting file. The job setting file is also called a JDF (Job Definition Format). This job setting file will be described later. The operator changes the print settings on the printer driver in advance before he or she issues a print instruction from the application. Print setting items that can be set using the printer driver include an Nup setting used to lay out, e.g., N pages on one page in a reduced scale, double-/single-sided setting, staple setting, color/monochrome setting, and the like.

The spooler 302 loads a spool file manager 304 stored in the external memory 111 onto the RAM 102, and notifies the spool file manager 304 of the generation state of the spool file 303. After that, if the spool file manager 304 determines that print processing is ready to be executed using the intermediate data stored in the spool file 303, it loads a despooler 305 stored in the external memory 111 onto the RAM 102. The spool file manager 304 instructs the despooler 305 to execute print processing of page rendering files described using the intermediate codes (UDL) described in the spool file 303. In this case, the spool file manager 304 loads a previewer 306 stored in the external memory 111 onto the RAM 102, and notifies it of the job ID to set the previewer 306 in the standby state.

The despooler 305 re-generates GDI functions in accordance with the contents of the page rendering files of the intermediate codes included in the spool file 303 and the job setting information included in the spool file 303. The re-generated GDI functions are output via the graphic engine 202 as the rendering means of the OS once again.

If the print instructions (DDI functions) received by the dispatcher 301 from the graphic engine 202 are those (GDI functions) issued by the despooler 305, the dispatcher 301 passes the print instructions to the printer driver 203.

The printer driver 203 generates printer control commands in a page description language (PDL) or the like based on the print instructions (DDI functions) acquired from the graphic engine 202, and sends the generated commands to the printer 2000 via the system spooler 204 as a print job. In this embodiment, if a preview mode is designated from a user interface or the like of the printer driver, a preview attribute is appended to the PDL commands, which are transmitted to the printer. For example, the preview attribute is appended to information (job control information) associated with a job as a unit of print processing, and that information is transmitted to the printer. The printer 2000 does not print the print job appended with the preview attribute onto paper sheets, but it generates preview information associated with the job ID and transmits the generated information to the computer 3000. The preview information includes information required to display a preview such as layout information indicating the layout of pages which are to be actually printed on paper sheets and are stored in the spool file 303, staple positions of respective physical pages, and the like. Note that a paper sheet which is to actually undergo printing is also called a sheet or physical page. Also, a page stored in the spool file 303 is also called a logical page. In addition, the preview information includes a blank page determination result (blank page information) indicating whether or not a page of interest is a blank page, and color mode information indicating one of monochrome and color.

The previewer 306 configures a preview unit 310 together with a setting change editor 307. Upon reception, from the printer (printing apparatus), of the preview information corresponding to the job ID received from the spool file manager 304, the previewer 306 stores the received preview information in the spool file 303. At the same time, the previewer 306 pops up a window of the spool file manager, and displays, as a list, job IDs associated with the preview information spooled in the spool file 303 on the window. Note that the preview information is also called "JDFP" (Job Definition Format For Preview) for short.

Figure 8:
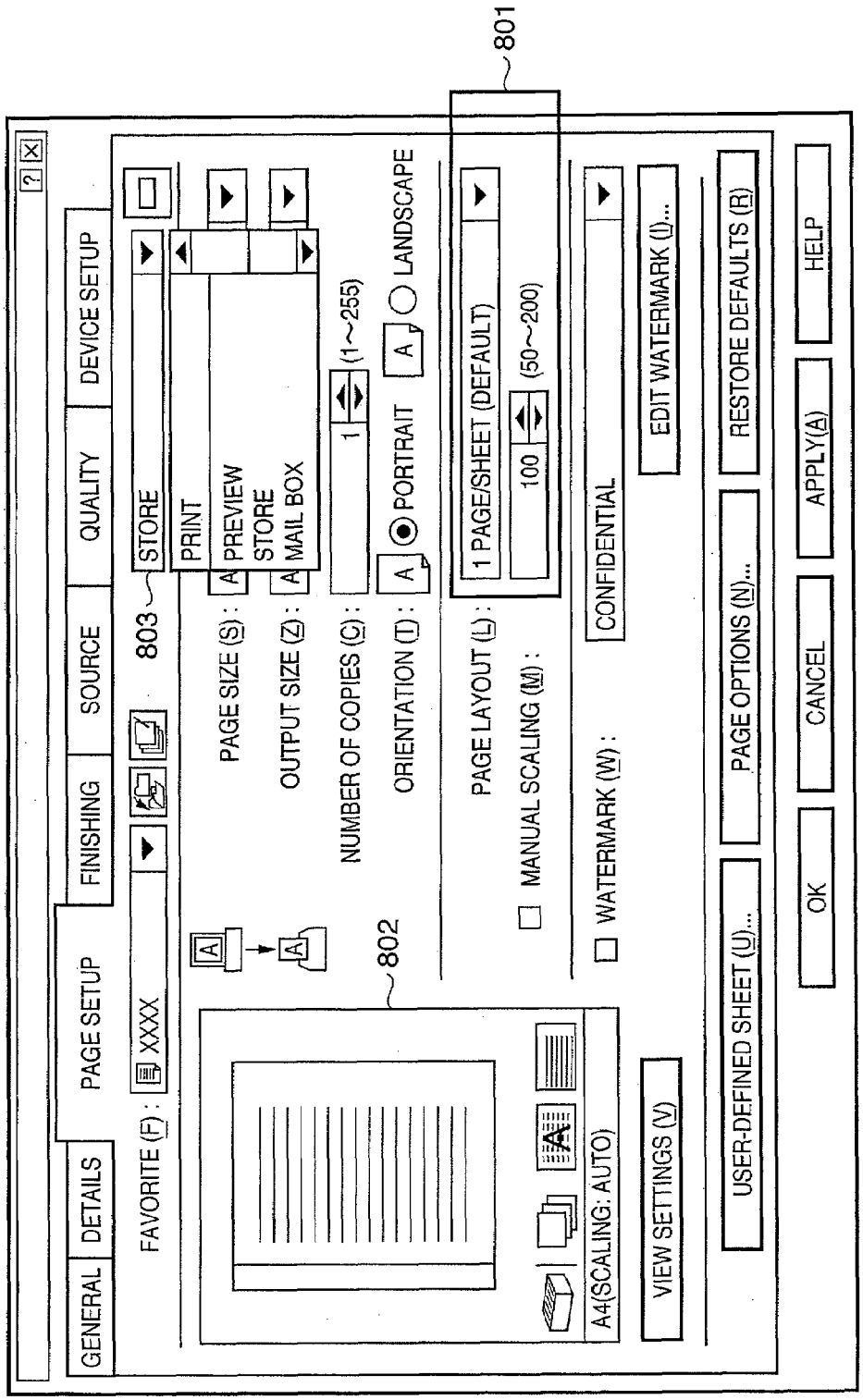
FIG. 8 shows an example of a print setting window of a printer driver.

The user can set to display a preview by providing a user interface window shown in, e.g., FIG. 8. In order to display a print preview and to change the print settings, the user must designate "store" from a pull-down menu (also called output method selection means) 803 as means for "designating an output destination" on the property window of the printer driver shown in FIG. 8. When the user wants to display only a preview, he or she selects "preview" from the pull-down menu 803 as designation of the output destination.

Figure 9:
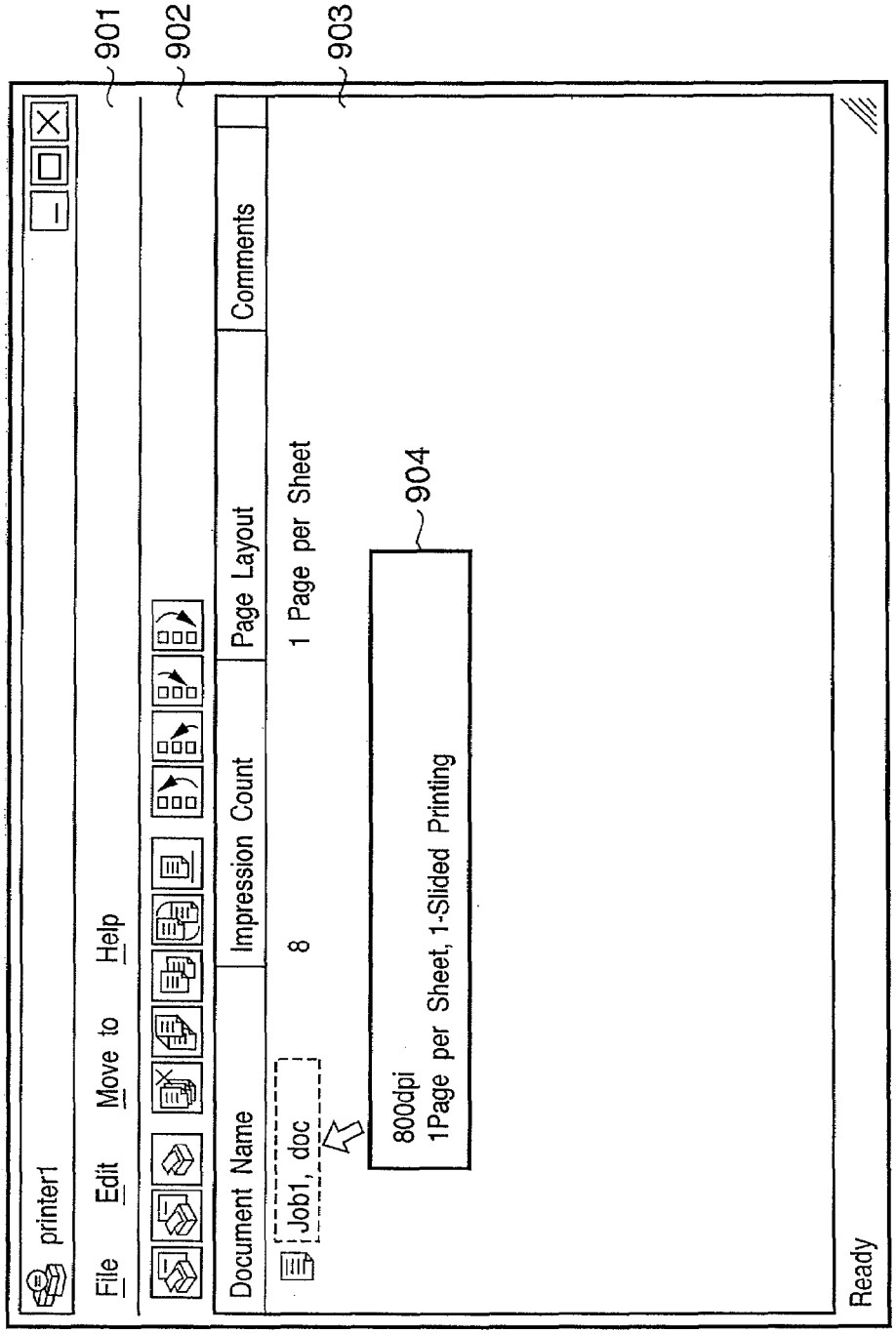
FIG. 9 shows an example of a list display window of a spool file.

FIG. 9 shows a display example of the print state when one print job is spooled. By pressing one of menu bar items 901 or one of menu icons 902 immediately below the menu bar, the user can manipulate a job. The manipulations that the user can make using the menu bar 901 are the same as those that he or she can make using the menu icons 902. The manipulations include "print", "save & print", "preview", "delete", "copy", "edit job", "change order", and the like. "Print" is a manipulation for making the printer 2000 print a print job selected from a list 903. "Save & print" is a manipulation for making the printer print the print job selected from the list 903 while leaving the spool file of the intermediate codes of that print job intact. "Preview" is a manipulation for displaying a preview of the print job selected from the list 903 while reflecting the print settings. "Delete" is a manipulation for deleting the spool file of the intermediate codes of the print job selected from the list 903. "Copy" is a manipulation for copying the spool file of the intermediate codes of the print job selected from the list 903. "Job edit" is a manipulation for changing the print settings (layout setting, finishing setting, and the like) of the job selected from the list 903. "Change order" is a manipulation for changing the print order of jobs.

When the user selects a certain print job and designates its preview on the window (FIG. 9) of the spool file manager 304, the spool file manager 304 loads the previewer 306 stored in the external memory 111 onto the RAM 102. The spool file manager 304 designates the previewer 306 to execute preview processing of the job of the intermediate codes described in the spool file 303.

Upon reception of the designation, the previewer 306 receives the preview information from the printer, and sequentially reads out page rendering files (UDL) of the corresponding intermediate codes included in the spool file 303. The previewer 306 modifies the page rendering files in accordance with the setting information for respective pages included in the preview information (JDFP), re-generates GDI functions based on the modified intermediate data (page rendering files), and outputs the re-generated GDI functions to the graphic engine 202. In this case, a client area of the previewer 306, i.e., a display device is designated as the output destination. In this manner, since the graphic engine 202 which received the GDI functions outputs DDI functions for the display device, a display output onto the screen can be attained. Note that the preview information and page rendering files can be associated with each other using the job ID of the print job. Since the job ID is included in both the preview information and spool file, the preview information and spool file having the same job ID can be associated with each other as information pertaining to an identical print job.

The graphic engine 202 can perform appropriate rendering in accordance with the designated output destination. For example, the display device and printing apparatus have different resolutions. The graphic engine 202 acquires attribute information such as the resolution of the designated output destination and the like from, e.g., a database or the like managed by the OS, and executes rendering using the acquired information. As described above, the previewer 306 can be implemented by the method of modifying the intermediate codes included in the spool file 303 in accordance with the preview information (JDFP) and outputting the modified intermediate codes using the graphic engine 202.

<Software Configuration of Printer 2000>

The operation of the printer (printing apparatus) 2000 shown in FIG. 3 will be described below. The printer 2000 receives printer control commands such as PDL commands or the like from the host computer 3000, and temporarily stores them in a reception buffer 2003. A command interpreter 2007 interprets the printer control commands such as the PDL commands. As a result of interpretation, if the received printer control commands are print commands, a rendering processing execution unit 2005 rasterizes image data in accordance with the print settings of the print job of interest, and temporarily stores the image data in an HD 2011. After the image data that can be output is stored, an output controller 2008 converts the image data into a video signal in synchronism with engine rotations (ship processing), and passes the video signal to a printer engine 2010. The printer engine 2010 forms images on sheets in accordance with the video signal. Note that the job includes a series of printer control commands delimited by a job start command. The job setting information indicating the print settings is transmitted from the host computer 3000 to the printing apparatus 2000 after, e.g., the job start command. Whether one job is a print job or preview job is indicated by, e.g., the value of a "job type" field in the job setting information. Alternatively, the value of the "job type" field in the job setting information may be copied to the job start command, so that the job start command indicates the job type.

In this embodiment, if the job received by the printing apparatus 2000 is a preview job, the rendering processing execution unit 2005 rasterizes image data in accordance with the designated settings in the same manner as in the print job. The rasterized image data is temporarily stored in the HD 2011 together with the job ID. The rendering processing execution unit 2005 associates detailed preview information (JDFP) for respective physical pages generated during the process for rasterizing image data to process it to a state immediately before printing, and the temporarily stored image data, and saves them as a set.

The generated preview information is returned to the previewer 306 of the host computer 3000 as the transmission source of the job. In order to speed up the preview processing, the generation time of the preview information (JDFP) may be shortened by simplifying the processing for rasterizing to an image, and after the preview information is returned to the previewer, image data to be printed may be rasterized.

The previewer 306 sends, to the printer, print instructions with a preview attribute generated by the printer driver 203 based on the job setting information (JDF) and page rendering files (UDL). As a result, the printer executes the same processing as actual print processing, and generates accurate preview information (JDFP) as in actual printing. The preview information generated by the printing apparatus has the same data format as that of the job setting information. However, unlike the job setting information, the preview information is generated for each physical page. Also, the preview information includes items different from the job setting information. The job setting information and preview information will be described later with reference to FIGS. 12, 13, and the like. The previewer 306 modifies data of the spooled page rendering files (UDL) based on the preview information (JDFP) received from the printer, and outputs the modified data to the display. In this way, an accurate preview display can be attained.

Figure 11:
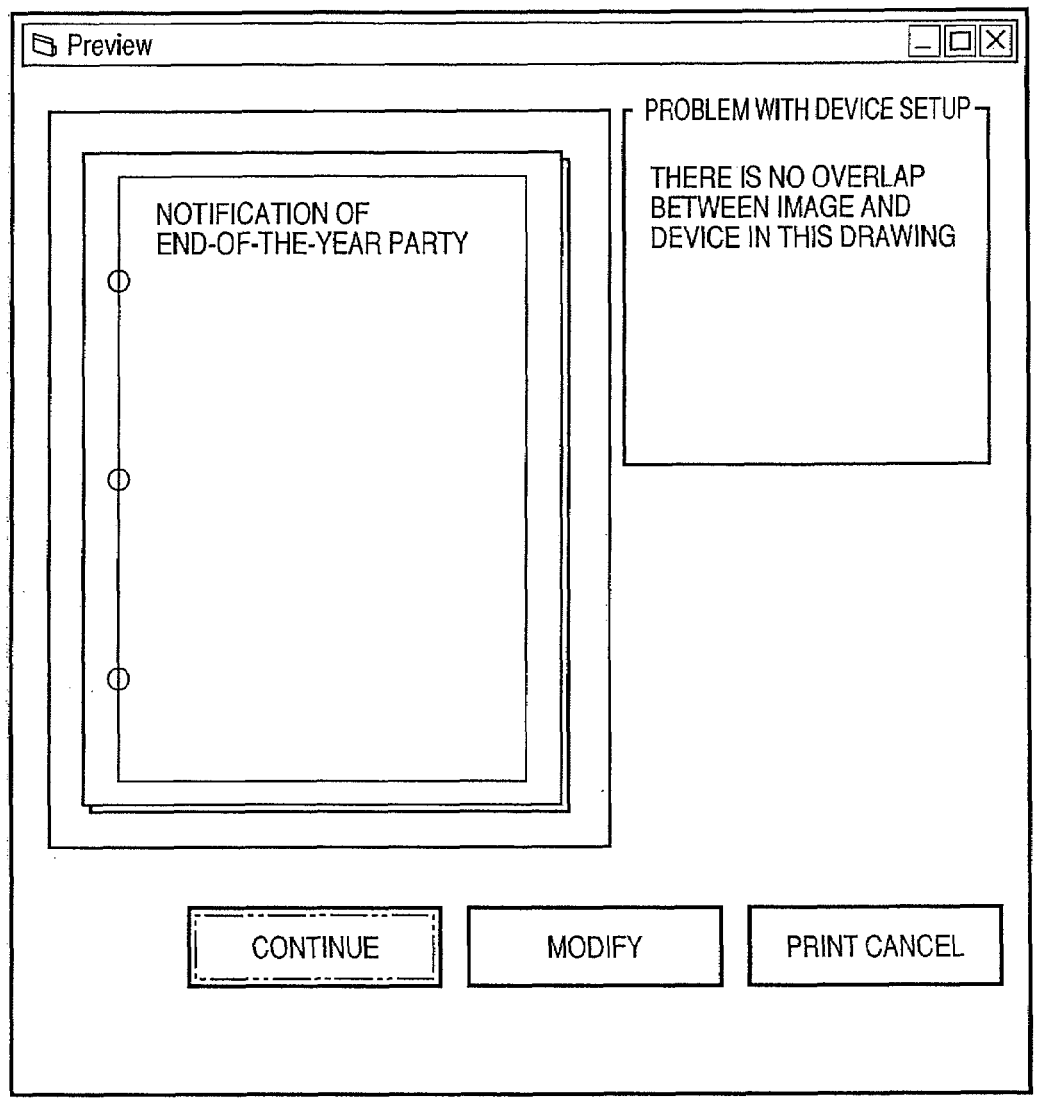
FIG. 11 shows an example of a preview window.

As a result of the above preview processing, the previewer 306 displays previews as large as printouts that reflect the job settings included in the spool file 303 on the screen, as shown in FIG. 11. After that, if the user instructs to clear the displayed contents, the previewer 306 is closed, and the control shifts to the spool file manager 304. The spool file manager 304 displays a window (FIG. 9).

Upon executing job setting/print processing displayed on the previewer, the user designates "print" or "save & print" on the window of the spool file manager 304 to issue a print request to the graphic engine 202. If the print settings are not to be changed, the user can designate the job ID in the print request. The printer which received the printer control commands of the print request via the graphic engine 202 and the like can output images which correspond to the designated job ID and have already undergone RIP (have already been rasterized to image data) at high speed.

Upon changing the print settings, the user changes the print settings such as the layout, paper orientation, print order, paper cassette to be used, and the like from the print setting window provided by the previewer 306, and settles the changes. The setting change editor 307 edits the job setting information (JDF) corresponding to the preview job saved in the spool file 303 in accordance with the contents of the changed print settings. The despooler 305 reads out the edited job setting information from the spool file 303, and passes it to the printer driver 203 together with the job ID via the graphic engine 202 and the like. The printer driver 203 generates printer control commands corresponding to differences from the printer control commands of the already transmitted job, and outputs them to the printing apparatus 2000. In this case, the differences are limited to those in the job setting information. Therefore, for example, new printer control commands required to transmit the job setting information to the printing apparatus 2000 are generated, and are transmitted to the printing apparatus 2000 together with the job ID. This job ID is the same as that of the preview job which was transmitted first to the printing apparatus 2000.

<Processing Flow>

Figure 16:
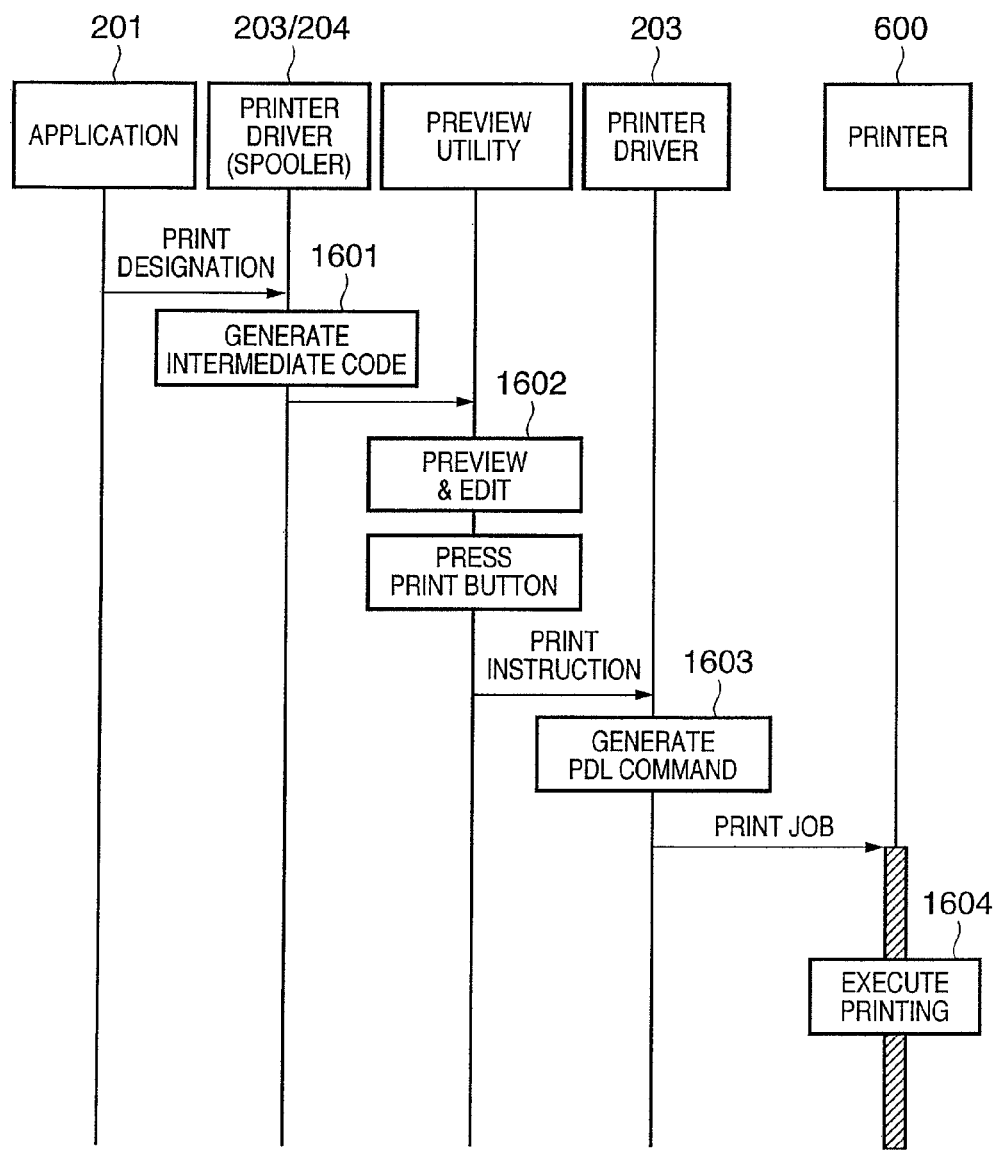
FIG. 16 is a chart showing the flow of the overall conventional preview processing system.

The processing flow of the conventional preview scheme will be described below using FIGS. 2 and 16. FIG. 16 shows an example of the processing flow of the overall conventional preview processing system. Upon reception of a print instruction from the application 201, the printer driver 203 generates intermediate codes (processing step 1601). The generated intermediate codes are saved in a spool file. A preview utility generates an image to be displayed by loading the intermediate codes, and displays a preview on the screen of a personal computer (processing step 1602). If the display result has no problem, the user presses a print button to call the printer driver 203. The printer driver 203 generates PDL commands (printer control commands) (processing step 1603). Upon reception of the print job including the PDL commands from the printer driver 203, a printer 600 starts print processing from PDL command interpretation (processing step 1604). The preview utility of the host computer generates and displays a preview image using the intermediate codes.

FIG. 17 shows an example of the processing sequence of the overall system of this embodiment. Upon reception of a print instruction from the application 201, the printer driver 203 generates intermediate codes (processing step 1701). The spooler 302 saves the intermediate codes in the spool file 303. The preview unit 310 loads the spooled intermediate codes, and issues a print instruction to the printer driver 203. Note that this print instruction includes information indicating preview. For example, information indicating preview is described in the job setting information. The print instruction including information indicating preview is referred to as a preview instruction in this invention. Upon reception of the print instruction (i.e., preview instruction), the printer driver 203 generates PDL commands (processing step 1702). The printer driver 203 appends a preview attribute to the generated PDL commands, and transmits them as print instructions with the preview attribute to the printer 2000. The print instruction send to the printer 2000 from the printer driver 203 is referred to as a print job. The print job with the preview attribute is referred to as a preview job. Upon reception of the print job with the preview attribute, the printer 2000 interprets the PDL commands to generate preview information (JDFP), and returns the generated preview information to the host computer (processing step 1703). A final recipient of the preview information in the host computer is the preview unit 310. The printer 2000 also executes RIP processing of the print job with the preview attribute received after interpretation of the PDL commands to generate image data. The generated image data are stored in the hard disk together with the preview information in association with the job ID (processing step 1705). However, as this RIP processing, the same RIP processing as that upon reception of the print job is executed to generate image data to be printed. If the PDL commands are also saved, only information associated with differences may be received after the settings have been changed. Hence, it is desirable to store the PDL commands. In this embodiment, the received PDL commands are also stored.

The preview unit 310 loads the spooled intermediate codes, and makes preview display in accordance with the preview information (JDFP) received from the printer 2000 (processing step 1704). The spooled intermediate codes include image information for respective pages such as objects to be rendered for respective physical pages, and the like. The preview information includes information associated with the print settings such as the layout for each physical page, finishing information, and the like. The preview unit 310 rasterizes the intermediate codes to those for display, lays out logical pages in accordance with the print settings described in the preview information, and appends image objects according to output materials. The image objects to be appended include those which represent punch holes, staples, a watermark, character strings of tab sheets, and the like. When a finisher has an inserter function, image objects that represent sheets such as a front cover sheet, back cover sheet, tab sheets, and the like to be inserted by an inserter, and objects such as character strings, images, and the like written on these sheets to be inserted are inserted in accordance with the preview information. If a finisher having a bookbinding function is added to the printer 2000, the preview unit 310 also appends identification objects indicating the bookbinding positions and the like. In this way, preview images are generated and displayed in accordance with the preview information.

When the user changes the print settings, the preview unit 310 reflects the changed print settings in the job setting information. Also, the preview unit 310 sends a print instruction to the printer driver 203 via the graphic engine 202. The printer driver 203 generates difference PDL commands (processing step 1710). Since information changed by the preview unit 310 is limited to the job setting information, new PDL commands are generated as difference PDL commands. The difference PDL commands are transmitted to the printer 2000 together with the job ID. This job ID is the same as that of the preview job which was transmitted to the printer 2000 first. Upon reception of the difference PDL commands, the printer 2000 generates preview information again with reference to its job ID (processing step 1707). In processing step 1707, for example, the printer 2000 substitutes the job setting information received as the difference PDL commands with that in the PDL commands stored in association with that job ID. The printer 2000 then generates preview information based on the substituted PDL commands. The printer 2000 transmits the generated preview information to the preview unit 310 as the request source of the preview information. After that, the printer 2000 executes RIP processing using the changed job setting information to reflect the changed print settings in image data, thus updating the stored image data (processing step 1709). This RIP processing may be executed for only a changed part if the settings are partially changed. However, since the changed part in job setting information influences all the pages included in the job of interest even when settings are changed partially, it is desirable to execute the RIP processing for the entire job again.

The preview unit 310 generates and displays preview images using the received preview information and the spooled intermediate codes and accepts the print button (processing step 1708). When the user has depressed the print button after he or she confirms the preview images, the preview unit 310 sends the print instruction to the printer driver 203. The printer driver 203 generates difference PDL commands, and sends a print job to the printer 2000 (processing step 1710). However, if the print settings are not changed, since there is no difference information to be sent, the print job to be transmitted to the printer 2000 at this time need only include information indicating that the job is a print job, and the job ID.

If the stored PDL commands are not changed, the printer 2000 prints out the images generated in processing step 1709. If the stored PDL commands are changed, the printer 2000 generates and prints image data that reflect the changes (processing step 1711). Image data obtained by applying RIP processing to only the changed part may be printed in place of the image data with the same job ID, but the entire job may undergo the RIP processing again.

As described above, the printer driver works as a print instruction transmission means that generates, when a preview instruction of data is issued, printer control commands according to print data together with a job type indicating preview, and transmit the generated printer control commands to the printer. In addition, the previewer works as a preview means that generates and displays a preview image based on preview information which is generated by the printer 2000 in accordance with the printer control commands and which indicates layouts and finishing processing for respective physical pages. Moreover, the printer driver works as a setting change means that generates, when the print settings are changed, print instructions associated with a changed part.

<Processing by Spooler>

Figure 5:
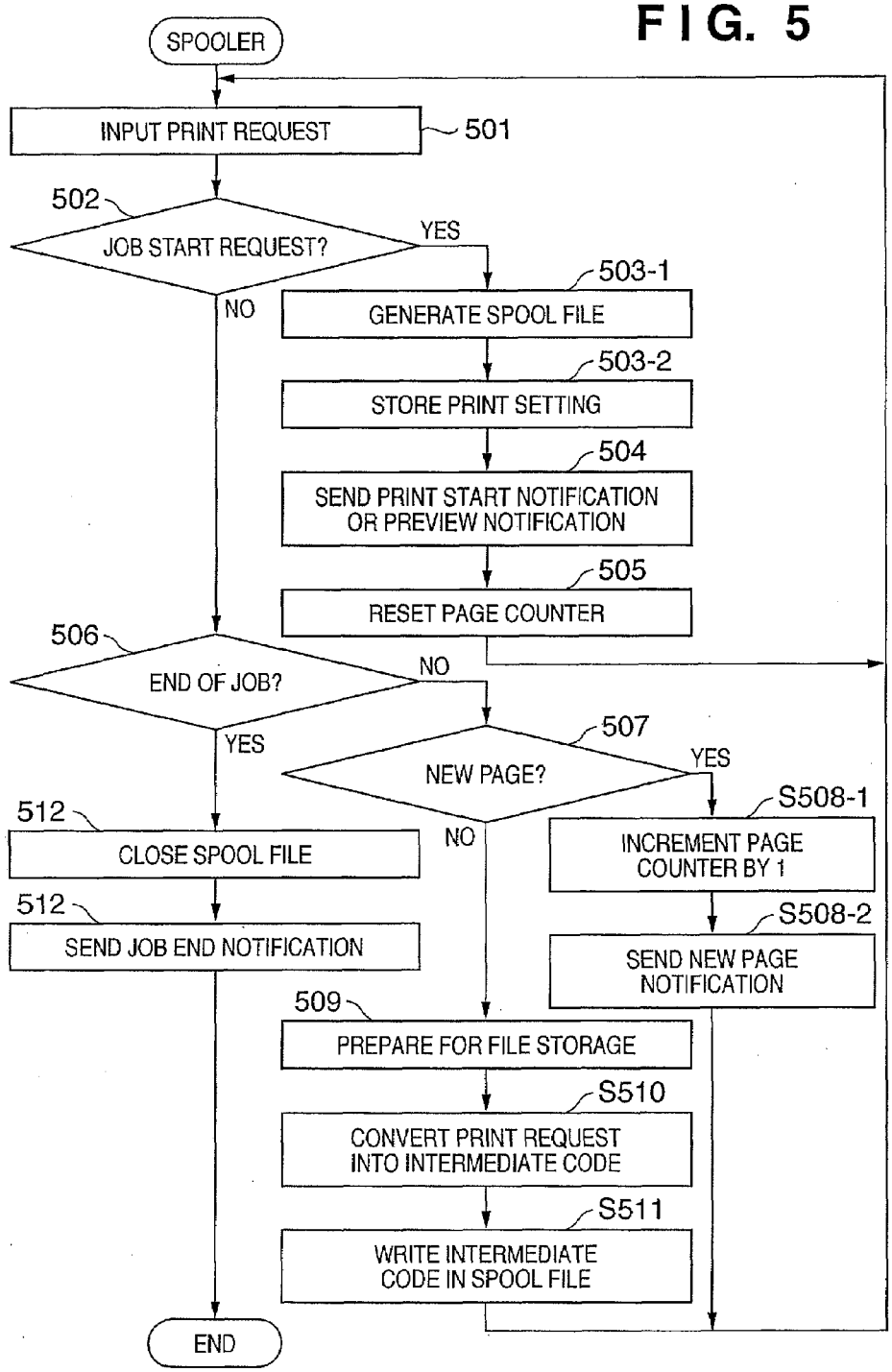
FIG. 5 is a flowchart showing the processing in a spooler 302.

FIG. 5 is a flowchart showing the storage processing of the intermediate codes for respective pages in generation of the spool file 303. This processing is executed after the dispatcher 301 accepts DDI functions as rendering data output from the graphic engine 202 and passes this rendering data to the spooler 302 upon reception of a print request from the application.

In step 501, the spooler 302 accepts a print request issued by the application from the dispatcher 301 via the graphic engine 202. As described above, the application 201 displays a dialog used to input the print settings, as shown in FIG. 8, before a print instruction, and the printer driver 203 passes job setting information indicating the print settings input from this dialog to the spooler 302. Note that the setting input dialog shown in FIG. 8 includes setting items 801 used to determine the number of logical pages to be laid out per physical page, and the like.

The spooler 302 checks in step 502 if the accepted print request is a job start request. If the spooler 302 determines in step 502 that the accepted print request is a job start request, the process advances to step 503-1, and the spooler 302 generates a spool file 303 used to temporarily store intermediate data on the RAM 102 (or on the hard disk). Subsequently, the spooler 302 receives print setting information (corresponding to DEVMODE of Windows®) from the printer driver 203, and stores job setting information (JDF) in the spool file 303 (step 503-2). After that, the spooler 302 notifies the spool file manager 304 of the progress of print processing. In this case, if the job designated by the user is a preview job, the spooler 302 sends a preview notification to the spool file manager 304; if the job is a print job, the spooler 302 sends a print start notification to the manager 304 (step 504).

Next, in step 505 a page counter managed by the spooler 302 is reset to 1. Note that the spool file manager 304 loads job information for the job, the print processing of which has started, and job setting information as modification settings from the job setting file of the spool file 303.

On the other hand, if the spooler 302 determines in step 502 that the accepted print request is not a job start request, the process advances to step 506. The spooler 302 checks in step 506 if the accepted request is a job end request. If the spooler 302 determines that the accepted request is not a job end request, the process advances to step 507, and the spooler 302 checks if the accepted request is a new page request. If the spooler 302 determines in step 507 that the accepted request is a new page request, the process advances to step 508-1 to increment the page counter. In step 508-2, the spooler 302 notifies the spool file manager 304 of the progress of print processing. In this case, the spooler 302 notifies the spool file manager 304 of reception of the new page request as the progress information. At the same time, the spooler 302 may notify the page counter value.

If the spooler 302 determines in step 507 that the accepted print request is not a new page request, the process advances to step 509, and the spooler 302 prepares for extraction of intermediate codes (UDL) to each page rendering file. In step 510, the spooler 302 converts rendering data such as text data, graphic data, image data, and the like passed together with the print request into intermediate data to be stored in the spool file 303. In step 511, the spooler 302 writes the print request which is converted into a storable format (intermediate data) in step 510 in each page rendering file (UDL) of the spool file 303. After that, the process returns to step 501 to accept a print request from the application again. The spooler 302 repeats a series of processes in steps 501 to 511 until it received a job end request (End Doc) from the application.

At the same time, the spooler 302 acquires print setting information such as modification settings and the like stored in the DEVMODE structure (i.e., print setting information) from the printer driver 203, and stores it as job setting information (JDF) in the spool file 303. On the other hand, if the spooler 302 determines in step 506 that the print request from the application is a job end request, all print requests from the application end. Hence, the process advances to step 512, and the spooler 302 closes the spool file. In step 513, the spooler 302 notifies the spool file manager 304 of the progress of print processing (job end notification in this case), thus ending the processing.

<Processing by Spool File Manager>

Figure 6:
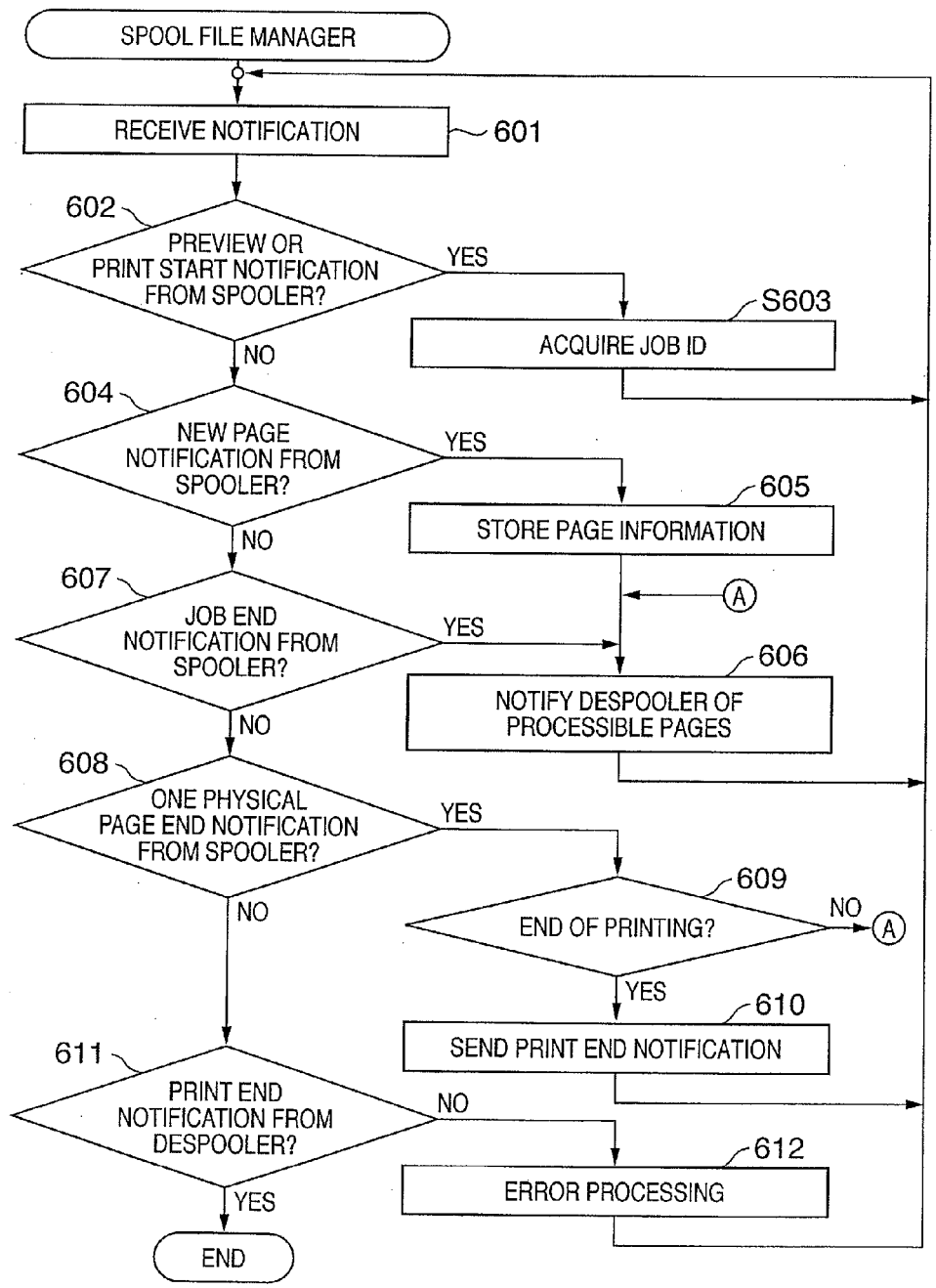
FIG. 6 is a flowchart showing the print control in a spool file manager 304.

FIG. 6 is a flowchart showing details of control between the spool file 303 generation process and a print data generation process (to be described later) in the spool file manager 304. In step 601, the spool file manager 304 accepts a progress notification or report of print processing from the spooler 302 or despooler 305.

The spool file manager 304 checks in step 602 if the progress notification is a preview or print start notification sent from the spooler 302 in step 504 above. If the accepted notification is a preview or print start notification, the process advances to step 603, and the spool file manager 304 acquires a job ID to start job management. The spool file manager 304 can acquire the job ID from a job ID generation counter or the like used to assign serial numbers in turn.

On the other hand, if the spool file manager 304 determines in step 602 that the accepted notification is not a preview or print start notification from the spooler 302, the process advances to step 604. The spool file manager 304 checks in step 604 if the progress notification is a new page notification sent from the spooler 302 in step 508 above, i.e., a processing end notification of one logical page. If the accepted notification is a processing end notification of one logical page, the process advances to step 605, and the spool file manager 304 stores page information for this page. The page information includes, e.g., a page ID (physical page and logical page), information indicating association between the logical and physical pages, and the like. In step 606, the spool file manager 304 determines a page number to be printed every time print instructions (intermediate codes) corresponding to one physical page are spooled, and sends to the despooler a processibility notification indicating that the physical page of interest is ready to process. The processibility notification includes a page ID of the physical page which is ready to output. For example, when a plurality of logical pages are laid out on one physical page, the spool file manager 304 receives a new page notification from the spooler every time it receives a logical page to be laid out on that one physical page. If data of all logical pages to be laid out on one physical page are not spooled yet, the processibility notification is not output in step 606. Only after data for one physical page are spooled, the processibility notification is output. Note that printing in this case includes preview processing.

The process then returns to step 601, and the spool file manager 304 waits for the next notification. In this embodiment, print processing can start even when spooling of the entire print job is not completed after print data for one physical page are spooled.

On the other hand, if the spool file manager 304 determines in step 604 that the accepted notification is not a print end notification for one logical page, the process advances to step 607. The spool file manager 304 check in step 607 if the received notification is a job end notification sent from the spooler 302 in step 512 above. If the received notification is a job end notification, the process advances to step 606 above. On the other hand, if the received notification is not a job end notification, the process advances to step 608, and the spool file manager 304 checks if the accepted notification is a print end (output end) notification for one physical page from the despooler 305. If the accepted notification is a print end notification for one physical page, the process advances to step 609 to check if print processing of the entire job is complete.

If the print (output) processing is complete, the process advances to step 610, and the spool file manager 304 sends a print end notification to the despooler 305. If the spool file manager 304 determines that the print processing is not complete yet, the process returns to step 606. Assume that the number of pages for which the despooler 305 of this embodiment can simultaneously execute print processing (output processing) is 1.

On the other hand, if the spool file manager 304 determines in step 608 that the input notification is not a print end notification for one physical page from the despooler 305, the process advances to step 611. The spool file manager 304 check in step 611 if the input notification is a print end notification from the despooler 305. If the spool file manager 304 determines that the input notification is a print end notification from the despooler 305, the processing ends. On the other hand, if the input notification is not a print end notification from the despooler 305, the process advances to step 612 to execute another normal processing, and the spool file manager 304 waits for the next notification.

If information required for executing print processing for one physical page is sequentially stored in a file in steps 605 and 606, the stored information is converted into a reusable format to issue a processibility notification. If the stored information is not reusable, an implementation method which uses a high-speed medium such as a shared memory or the like to overwrite a despooled physical page in turn, and saves the resources may be adopted. The delimiter of one physical page is determined with reference to the job setting information. When the progress of spooling is faster than that of despooling, or when despooling starts after the end of spooling for all pages, a page printable notification for each page may not be sent in step 606. In this case, the number of times of notification is saved by adopting the notification contents indicating that a plurality of or all physical pages are ready to print, in accordance with the progress on the despooler side.

<Processing by Despooler>

Figure 7:
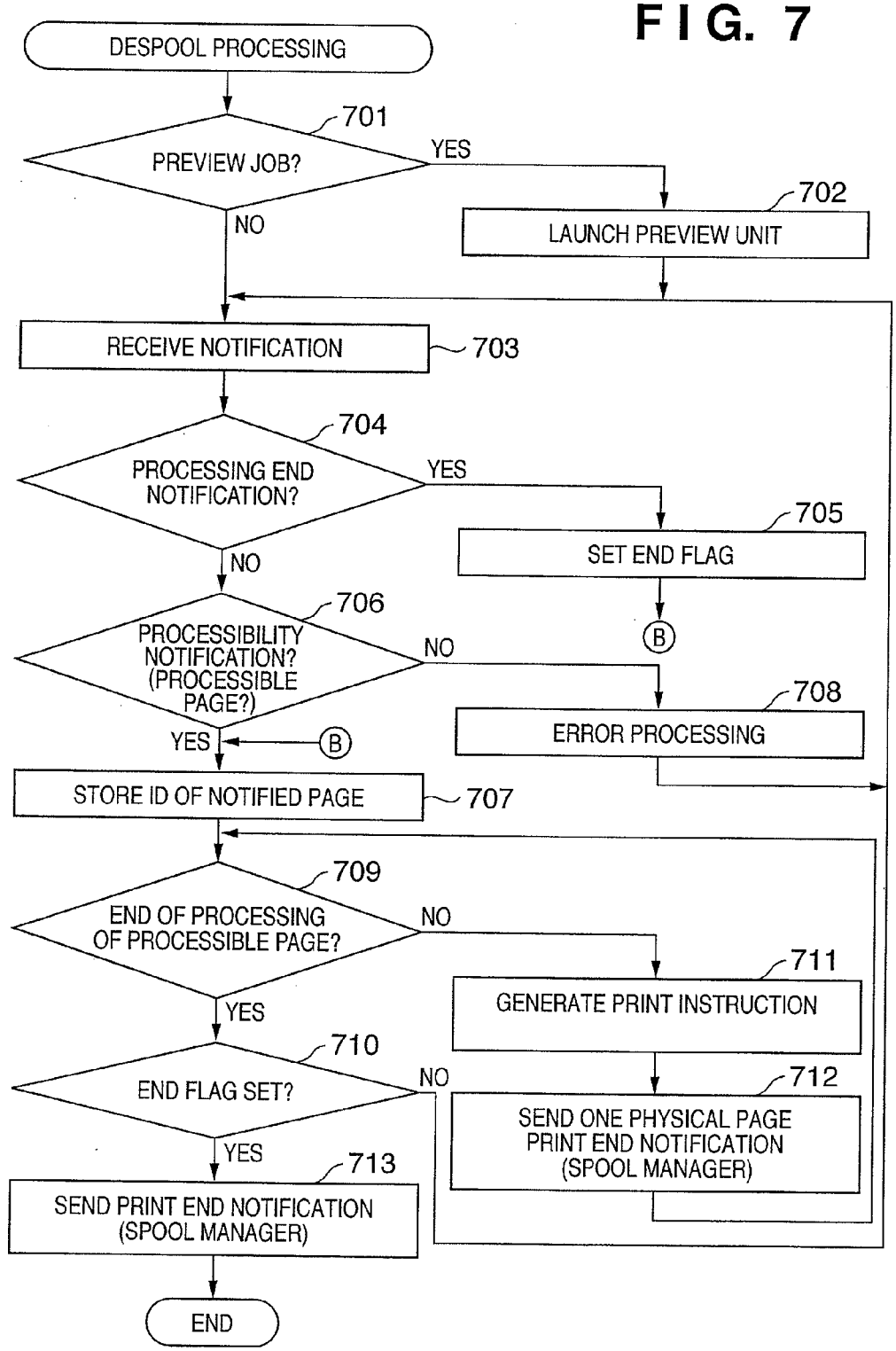
FIG. 7 is a flowchart showing the processing in a despooler 305.

FIG. 7 is a flowchart showing details of the print data generation process in the despooler 305. The despooler 305 generates print data by reading out necessary information (page rendering files (UDL) and job setting information (JDF)) from the spool file 303 in accordance with a print request from the spool file manager 304. The method of transferring the generated print data to the printer is as described above using FIG. 3. In the print data generation process by the despooler 305, the despooler 305 checks if the input job is a preview job (S701). If the input job is a preview job, the despooler 305 launches the preview unit 310 by notifying it of the job ID to be processed in step 702. The job type indicating a preview job or print job can be determined by referring to the job type field of the job setting information.

In step 703, the despooler 305 accepts a notification from the spool file manager 304. If a notification is input, the process advances to step 704. The despooler 305 checks in step 704 if the input notification is a job end notification. If the input notification is a job end notification, the process advances to step 705 to set an end flag. The process then advances to step 707.

On the other hand, if the despooler 305 determines in step 704 that the input notification is not a job end notification, the process advances to step 706, and the despooler 305 checks if the input notification is a processibility notification in step 606 in FIG. 6. If the despooler 305 determines in step 706 that the input notification is not a processibility notification, the process advances to step 708 to execute another error processing. The process then returns to step 701 to wait for the next notification. On the other hand, if the despooler 305 determines in step 706 that the input notification is a processibility notification, the process advances to step 707, and the despooler 305 stores a page ID in the processibility notification which notifies that the print processing is ready to start.

The despooler 305 then checks in step 709 if the output processing for all the pages of the physical page IDs stored in step 707 is complete. If the processing of all the pages is complete, the process advances to step 710 to check if an end flag is set. If the end flag is set, the despooler 305 determines that the print processing of the job is complete, and sends a processing end notification to the spool file manager 304, thus ending the processing. If the despooler 305 determines in step 710 that the end flag is not set, the process returns to step 701 to wait for the next notification.

On the other hand, if the despooler 305 determines in step 709 that pages which can undergo output processing still remain, the process advances to step 711. In step 711, the despooler 305 reads out a physical page ID to be processed in turn from the stored physical page IDs. The despooler 305 loads information required to generate print data of a physical page corresponding to the readout physical page ID from the spool file, and executes print processing (output processing).

In the print processing, the despooler 305 converts print request instructions (UDL) and job setting information (JDF) stored in the spool file 303 into a format that the graphic engine 202 can recognize, e.g., into GDI functions in the Windows® OS. The despooler 305 transfers these GDI functions to the graphic engine 202. Upon completion of print processing, the despooler 305 sends a print data generation end notification to the spool file manager 304 in step 712. The process returns to step 709, and the despooler 305 repeats print processing for all the physical page IDs stored in step 707.

With the above sequence, the despooler converts spooled intermediate codes into print instructions (GDI functions), and outputs them for each physical page.

<Processing by Printer>

Figure 15A:
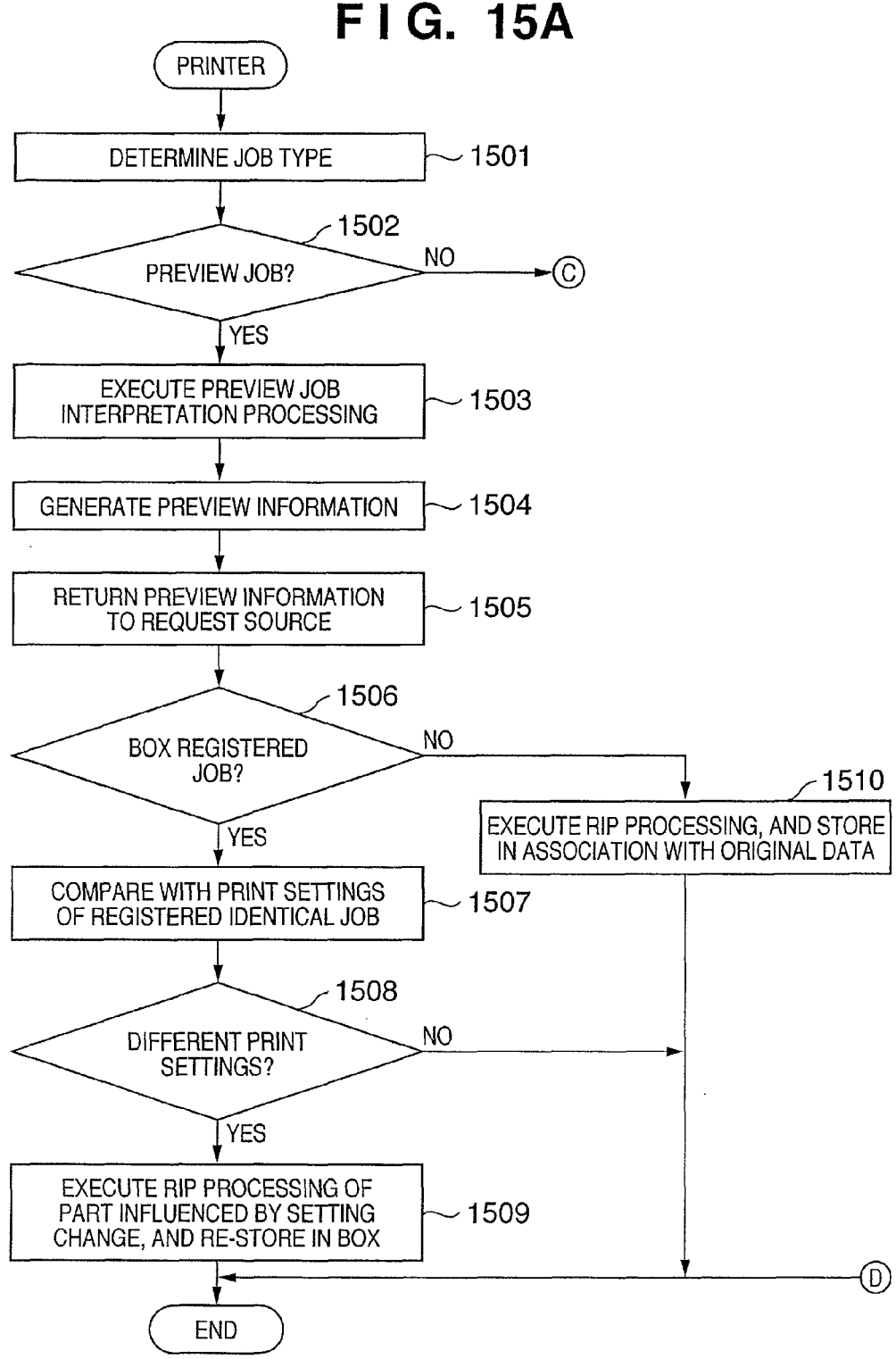
FIGS. 15A and 15B are flowcharts for explaining the preview processing and print processing of a printer.
Figure 15B:
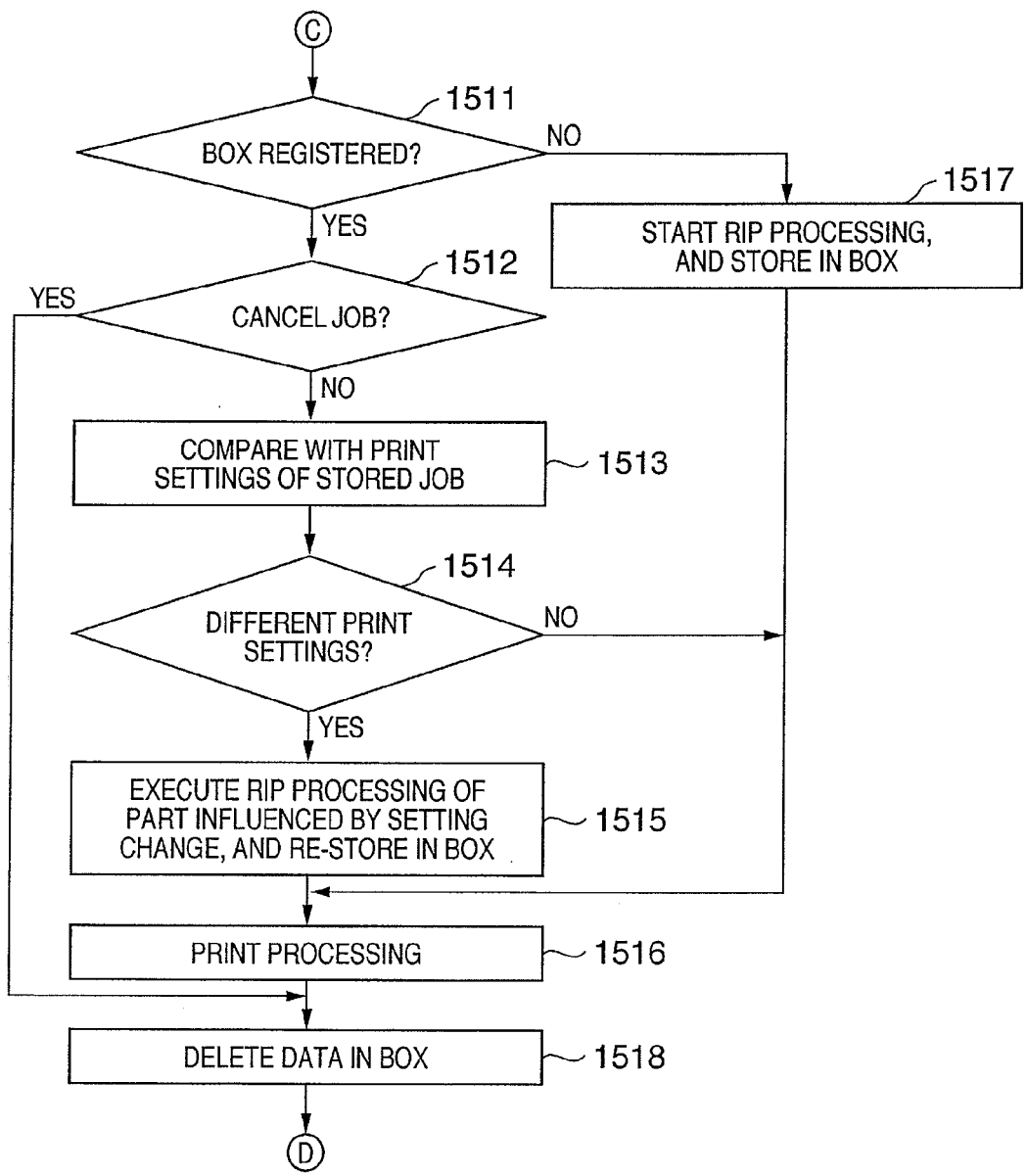

FIGS. 15A and 15B are flowcharts showing details of the process of the printer which receives print instructions with a preview attribute generated in step 711.

In step 1501, the type of a job included in the received PDL commands is checked. If it is determined in step 1502 that the received job is a preview job, the process advances to step 1503. In step 1503, the received PDL commands are interpreted to collect information required to display a preview. If the information required to display a preview includes information such as the paper cassette, exhaust destination, staple positions, and the like of respective physical pages, the information can be collected by interpreting the job setting information without executing RIP processing (rasterize processing to bitmap data) that takes much time. If the information required to display a preview includes that which requires the RIP processing such as blank page determination, color/monochrome determination, and the like, the RIP processing is executed in this step to collect information.

In step 1504, preview information (JDFP) is generated based on the information collected in step 1503, and the generated preview information is returned to the request source (host computer 3000 in this embodiment) of the preview job in step 1505.

Next, it is checked in step 1506 if the received PDL commands are those for the already registered job. "Already registered" means that print data and preview information associated with a job with the same job ID as that of the received PDL commands are registered in the printer 2000. If the received PDL commands belong to an unregistered job, the rendering processing execution unit 2005 of the printer 2000 executes RIP processing in step 1510. The generated image data are stored in the HD 2011 together with the preview information (JDFP) generated in step 1504, original data, and job ID, thus ending the processing.

If it is determined in step 1506 that the PDL commands are those for a BOX already registered job, the print settings of the already registered job are compared with those of the received job by referring to their job setting information in step 1507. Upon reception of the PDL commands in association with the already registered job, if, for example, these commands include job control information or print data of a certain page, that job control information is compared with that of the already stored preview information. If information stored in the printer is preview information, the preview information may be compared after preview information is generated based on the received PDL commands and is converted into the same format.

If it is determined in step 1508 that the print settings are different, RIP processing of a part influenced by the changed settings is executed, and image data are stored in the HD 2011 together with newly generated preview information (JDFP) in step 1509, thus ending the processing. That is, if image data which are left unchanged still remain, newly generated image data are merged with the already stored image data. If no image data which are left unchanged remain, the newly generated image data may be overwritten.

If it is determined in step 1502 that the received job is not a preview job, the job IDs registered in the HD 2011 are searched for that of the received PDL commands in step 1511. If a hit occurs, since the job ID of the received PDL commands has already been registered, the process branches to step 1512. If it is determined in step 1512 that the job of received PDL commands is a print cancel job, the process branches to step 1518; if it is a print job, the process branches to step 1513.

In step 1513, the print settings of the already stored job are compared with those of the received job by referring to their job setting information. If it is determined in step 1514 that the print settings are different, RIP processing of a part influenced by the changed settings is executed, and newly generated image data are stored in the HD 2011 in step 1515. The newly generated and stored image data are merged with already stored image data. In step 1516, the merged image data are transferred to the printer engine 2010, thus executing print processing. The process advances to step 1518 in response to a print end notification from the printer engine 2010.

If it is determined in step 1514 that the print settings are not different, data that have already undergone the RIP processing and are stored in the HD 2011 are printed in step 1516, and the process advances to step 1518, thus ending the processing. If it is determined in step 1511 that the job of interest is not stored in the HD 2011, RIP processing is executed in step 1517 to store generated image data in the HD 2011. In step 1516, the stored image data are transferred to the printer engine 2010 to execute print processing. In response to a print end notification from the printer engine 2010, the file of the print job whose print processing is complete is deleted from a BOX in step 1518, thus ending the processing. On the other hand, upon reception of a print processing completion notification from the printer 2000, the host computer 3000 deletes the file of the corresponding print job in the spool file 303.

<Preview Processing>

Figure 14:
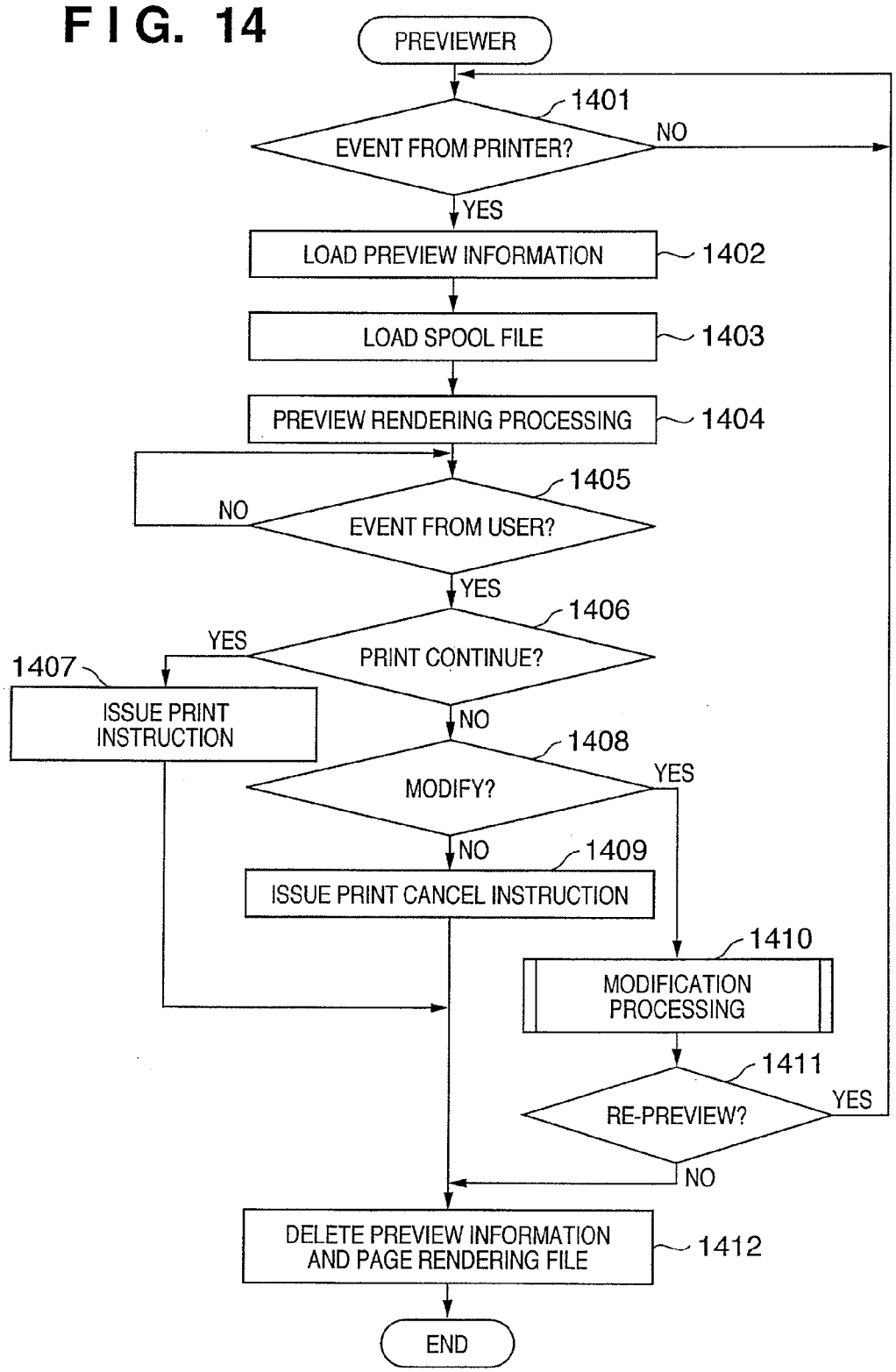
FIG. 14 is a flowchart for explaining the preview processing of a previewer.

FIG. 14 is a flowchart showing details of the preview process in the preview unit 310. The previewer 306 waits for an event from the printer in step 1401 after the despooler 305 is launched. An event is transmission of preview information in the example of FIG. 14. If an event is returned from the printer, the previewer 306 loads the received preview information (JDFP) in step 1402.

In step 1403, the previewer 306 reads out the page rendering files (UDL) of a job ID which corresponds to (matches) that of the preview information from the spool file 303. In step 1404, the previewer 306 executes preview rendering processing of the page rendering files (UDL) in accordance with the preview information (JDFP) (preview display).

In step 1405, the previewer 306 waits for an event from the user. If it is determined that the user has input a print processing continuation instruction without changing the settings of the preview display, the previewer 306 generates a print instruction and issues it to the printer in step 1407, and the process branches to step 1412. The print instruction is generated by the printer driver in accordance with a request from the previewer. This print instruction is a simple one including only a job ID without any changes in print settings, since it is issued to make the printer print the stored job intact.

If it is determined that the print processing of the job is not to be continued in step 1406, the process branches to step 1408. In step 1408, it is determined whether the user has instructed the previewer on modification of the print settings or cancellation of the print job. If it is determined that the user has instructed the previewer on cancellation of the print processing of the job in step 1408, the previewer 306 generates a print cancel instruction in step 1409, and the process then branches to step 1412.

If it is determined that the user has changed the print settings in step 1408, the process branches to step 1410. If the user has changed the print settings, job setting information (JDF) is generated from the preview information (JDFP) received in step 1402, and print instructions are sent again to the printer using the despooler 305 in step 1410. In this case, the processing time can be shortened by sending only a changed part. The setting change editor 307 executes this step.

If the user issues a re-preview request, the process branches to step 1401 according to the determination result in step 1411. If the user does not issue any re-preview request, the previewer 306 deletes the preview information (JDFP) and page rendering files (UDL) in the spool file 303, thus ending the processing.

The procedures of the print preview processing and print processing using the dispatcher 301, spooler 302, spool file manager 304, despooler 305, printer 2000, and previewer 306 have been described.

<Job Setting Information and Preview Information>

Figure 12:
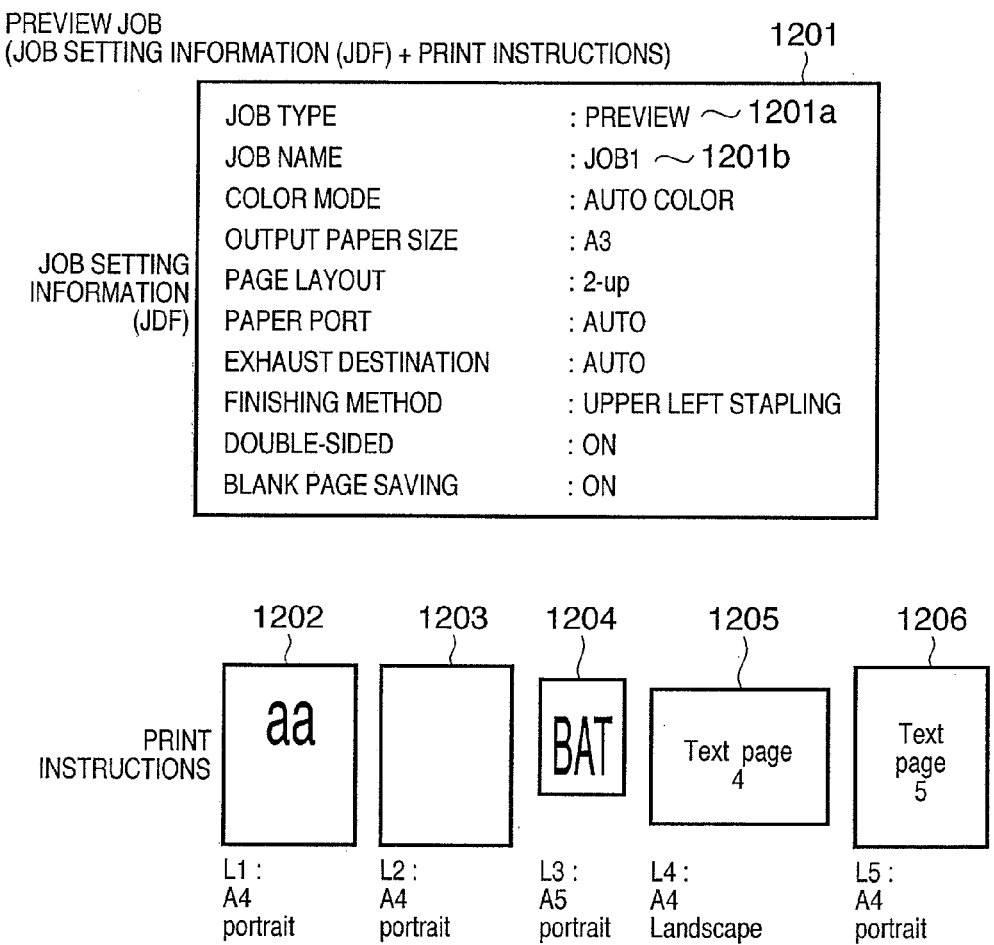
FIG. 12 shows an example of a preview job.

A preview job will be described below with reference to FIG. 12. In this example, the preview job includes job setting information (JDF) 1201 and print instructions (1202 to 1206). The preview job is transmitted as PDL commands to the printer. FIG. 12 illustrates the job setting information and print instructions included in the preview job. The job setting information (JDF) 1201 includes 10 records in FIG. 12, whose item names (indices) and their contents are delimited by tabs, and respective records are given as a text file delimited by, e.g., line feed codes. As the contents of the records, the job setting information (JDF) 1201 includes a job type 1201*a* indicating a type, i.e., preview or print, a job name (job ID) 1201*b*, and print settings copied from the print setting information.

In a Windows® printing system, since the settings set by the print settings on a printer driver are applied to the entire job, one setting data is generated for the entire job like the job setting information 1201.

However, as for print instructions defined by PDL commands or the like, the settings can be changed in the middle of the job like L3 is A5 portrait, L4 is A4 landscape, L5 is A4 portrait, and so forth after L1 and L2 starting from A4 portrait.

Preview information 1001 in FIG. 10 is an example of preview information (JDFP) generated by the printer 2000 which receives the job setting information 1201 and print instructions (1202 to 1206). The preview information includes the job setting information and physical page information. The physical page information includes finishing information indicating finishing processing such as stapling or the like which appears on each physical page, and configuring logical page information which includes a layout of logical pages that configure that physical page.

The implication of the preview information 1001 is expressed by pages 1002, 1003, 1004, and 1005. That is, L1, L2, L3, L4, and L5 are assigned to respective 2-up divided regions on the two faces of A3 landscape paper sheets. In this way, using the preview information, output materials to be printed can be re-configured. In this case, the configuring logical page information 1010 should be noted. In this information, the printer which generates the preview information describes a layout of logical pages. That is, this information includes logical page IDs, sizes, rotation angle, sizes after scaling (or scaling factors), reference position coordinates, and the like of logical pages included in one physical page. With reference to this configuring logical page information, the same physical page as that to be printed by the printer can be re-configured.

In addition, the preview information includes staple position information, blank page determination information, and accounting determination information for each page. The staple position information is referred to so as to re-configure the staple positions, and the blank page determination information is referred to so as to indicate the presence/absence of an image in a page.

Figure 13:
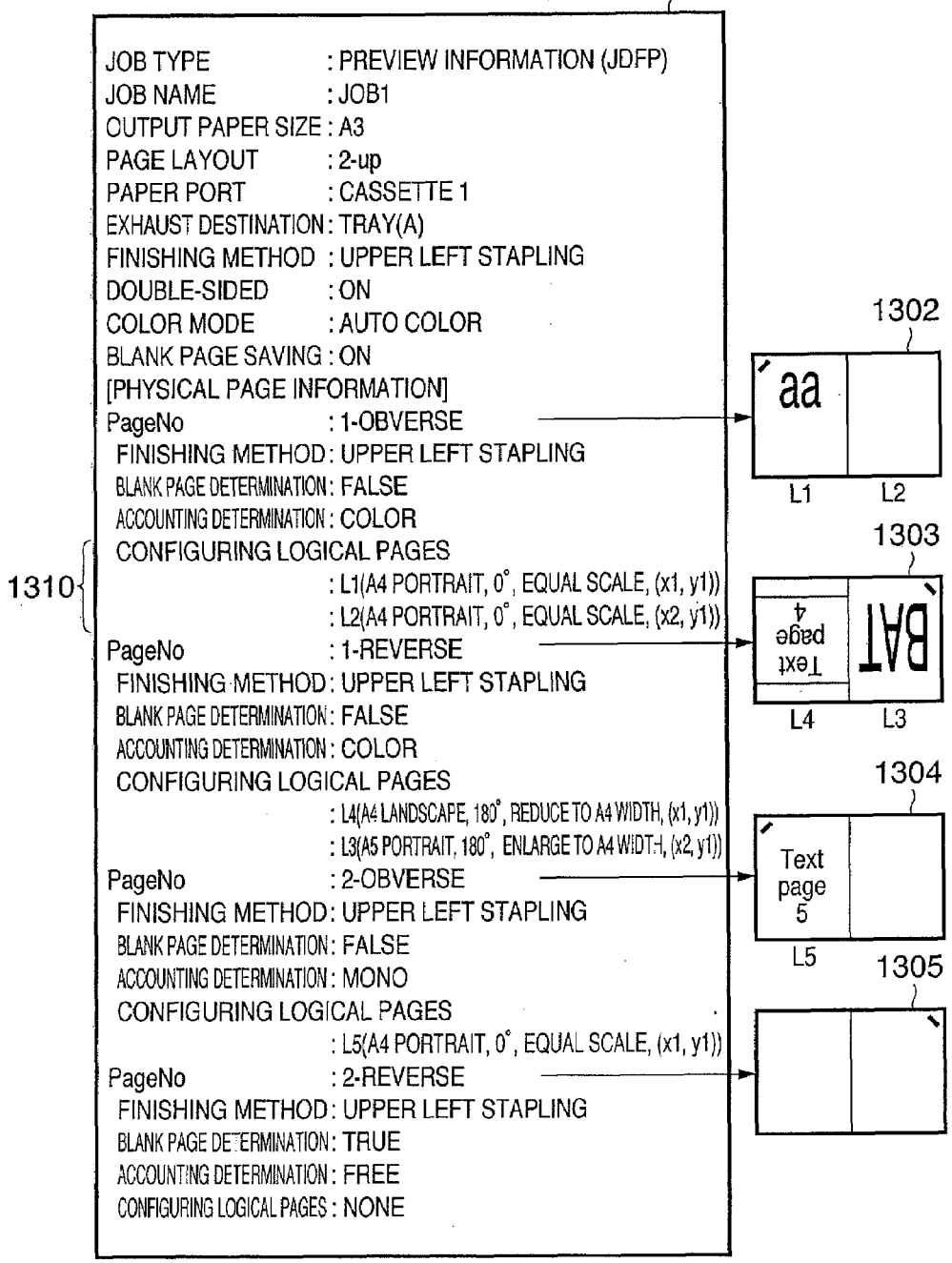
FIG. 13 shows an example of a preview job.

On the other hand, preview information 1301 in FIG. 13 is also an example of preview information (JDFP) which is generated by the printer that receives the job setting information 1201 and print instructions (1202 to 1206) in FIG. 12 and is different from FIG. 10. Unlike the preview information 1001 in FIG. 10, the rotation angles of logical pages included in configuring logical page information 1310 express that images on the reverse face are upside down to those on the obverse face. Also, the preview information represents that an L4 page has a layout which is reduced in scale to the width of an A4 sheet in the landscape direction.

In this way, the printer generates preview information that includes information of the layout of logical pages and finishing processing which are to be made according to the interpretation of the job setting information for each printer.

Job setting information 1801 in FIG. 18 is print instruction information generated when the previewer that receives the preview information 1001 changes the print settings on the reverse face of the first page to those on the reverse face of the first page in the preview information 1301. The setting change editor 307 generates job setting information and print instructions shown in FIG. 18 for a physical page whose settings have been changed, and transmits them to the printer driver. The printer driver converts these print instructions into PDL commands, and transmits the converted commands to the printer. In the example of FIG. 12, the printer driver converts the job setting information 1201 and print instructions associated with L3 and L4 pages into PDL commands, and transmits them to the printer. The printer stores the received difference to be merged with the already stored print data, and generates new preview information. The printer then transmits the new preview information to the host computer 3000. After that, the printer 2000 executes RIP processing to generate image data and stores the generated image data. The difference is merged with data of the stored job.

Figure 19:
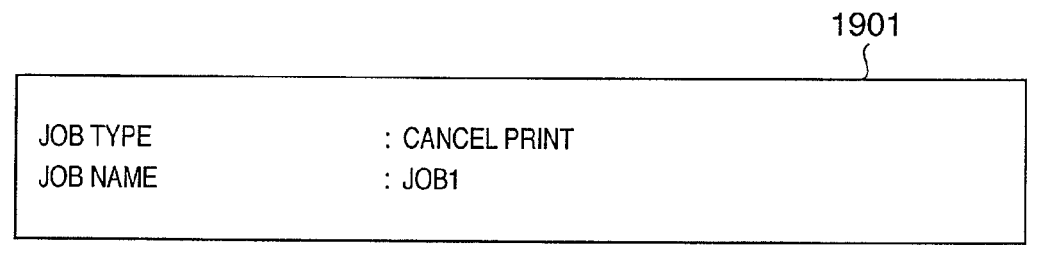

A message 1901 in FIG. 19 indicates a print cancel instruction generated by the previewer 306 which receives the preview information 1001. The print cancel instruction includes a job type and the job ID to be canceled. If the job type in FIG. 19 is changed to "print", a print instruction when the print settings are not changed is generated.

In this way, the output results of printers are of great variety depending on models, manufacturers, and the like, even if the application outputs identical data with identical print settings. According to this embodiment, a perfect preview that reflects different operations depending on models can be implemented.

Furthermore, since print instructions are already sent to the printer upon preview, the time required from determination of print processing to the end of the print processing can be shortened.

That is, according to the print system of this embodiment, an accurate preview display which reflects the states of output materials by the printer can be implemented. Furthermore, the user is allowed to change the print settings while displaying a preview window, and the changed print settings can be accurately reflected in the preview and printouts.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like). The objects of the present invention are also achieved by supplying a recording or storage medium, which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention.

The present invention also includes a case wherein the functions of the above-mentioned embodiments are implemented not only by executing the readout program code by the computer but also by some or all of actual processing operations executed by an operating system (OS) running on the computer on the basis of an instruction of the program code. Furthermore, the present invention is applied to a case wherein the program code read out from a storage medium is written in a memory of an expansion card or a function expansion unit which is inserted in or connected to the computer. In this case, the functions of the aforementioned embodiments are implemented by some or all of actual processes executed by a CPU or the like arranged in the function expansion card or unit based on the instruction of that program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2006-068272, filed Mar. 13, 2006, which is hereby incorporated by reference herein in its entirety.

What is claimed is:

1. An information processing apparatus comprising:
    a spool unit constructed to spool intermediate code generated based on a print request from an application;
    a preview unit constructed to read the spooled intermediate code and issue a print instruction; and
    a printer driver unit constructed to generate PDL commands based on the print instruction from the preview unit, and transmit a preview job to a printer, which is formed with the PDL commands and a preview attribute attached to the PDL commands, the PDL commands being generated based on the intermediate code;
    wherein the printer parses the preview job transmitted from the printer driver unit, creates preview information including a layout for each physical page and transmits the preview information including the layout for each physical page,
    wherein the preview unit receives the preview information including the layout for each physical page, which is transmitted from the printer based on the preview job, and
    wherein the preview unit reads the spooled intermediate code, and performs previewing based on the read intermediate code and the preview information received from the printer.

2. The apparatus according to claim 1, wherein the preview information further includes page configuration information indicating rotation of a page of which an orientation is different from other pages with maintenance of its size when 2-up printing, or page configuration information indicating reduction of a page of which an orientation is different from other pages with maintenance of its orientation when 2-up printing.

3. The apparatus according to claim 1, wherein the printer generates the preview information by performing a RIP processing when a blank page determination or a color/monochrome determination is included.

4. The apparatus according to claim 1, further comprising a modification unit constructed to modify the print settings based on the preview information in response to an instruction from a user,
wherein said preview unit performs previewing based on the modified print settings.

5. The apparatus according to claim 1, wherein the preview unit reflects the print settings in job setting information of the preview job in response to a change of the print settings made after previewing, and transmits the print instruction to the printer driver unit, and
the printer driver unit generates difference PDL commands and transmits the generated difference PDL commands to the printer.

6. An information processing method that is executed by an information processing apparatus, said method comprising:
spooling intermediate code generated based on a print request from an application;
by a preview unit, reading the spooled intermediate code and issuing a print instruction;
by a printer driver unit, generating PDL commands based on the print instruction from the preview unit, and transmitting a preview job to a printer, which is formed with the PDL commands and a preview attribute attached to the PDL commands, the PDL commands being generated based on the intermediate code;
by the printer, parsing the preview job transmitted from the printer driver unit, creating preview information including a layout for each physical page and transmitting the preview information including the layout for each physical page;
by the preview unit, receiving the preview information including the layout for each physical page, which is transmitted from the printer based on the preview job; and
by the preview unit, reading the spooled intermediate data, and performing previewing based on the read intermediate code and the preview information received from the printer.

7. The method according to claim 6, wherein the preview information further includes page configuration information indicating rotation of a page of which an orientation is different from other pages with maintenance of its size when 2-up printing, or page configuration information indicating reduction of a page of which an orientation is different from other pages with maintenance of its orientation when 2-up printing.

8. The method according to claim 6, wherein the printer generates the preview information by performing a RIP processing when a blank page determination or a color/monochrome determination is included.

9. The method according to claim 6, further comprising modifying the print settings based on the preview information in response to an instruction from a user,
wherein previewing is performed based on the modified print settings.

10. The method according to claim 6, further comprising the steps of:
by the preview unit, reflecting the print settings in job setting information of the preview job in response to a change of the print settings made after previewing, and transmitting the print instruction to the printer driver unit; and
by the printer driver unit, generating difference PDL commands and transmitting the generated difference PDL commands to the printer.

11. A non-transitory computer-readable storage medium storing a computer-executable program for causing an information processing apparatus to perform a method, the method comprising:
a spool step for spooling intermediate code generated based on a print request from an application;
by a preview unit, reading the spooled intermediate code and issuing a print instruction;
by a printer driver unit, generating PDL commands based on the print instruction from the preview unit, and transmitting a preview job to a printer, which is formed with the PDL commands and a preview attribute attached to the PDL commands, the PDL commands being generated based on the intermediate code;
by the printer, parsing the preview job transmitted from the printer driver unit, creating preview information including a layout for each physical page and transmitting the preview information including the layout for each physical page;
by the preview unit, receiving the preview information including the layout for each physical page, which is transmitted from the printer based on the preview job; and
by the preview unit, reading the spooled intermediate code, and performing previewing based on the read intermediate code and the preview information received from the printer.

12. The non-transitory computer-readable storage medium storing a computer-executable program of claim 11, wherein the preview information further includes page configuration information indicating rotation of a page of which an orientation is different from other pages with maintenance of its size when 2-up printing, or page configuration information indicating reduction of a page of which an orientation is different from other pages with maintenance of its orientation when 2-up printing.

13. The non-transitory computer-readable storage medium storing a computer-executable program of claim 11, wherein the printer generates the preview information by performing a RIP processing when a blank page determination or a color monochrome determination is included.

14. The non-transitory computer-readable storage medium storing a computer-executable program of claim 11, the method further comprising modifying the print settings based on the preview information in response to an instruction from a user,
wherein previewing is performed based on the modified print settings.

15. The non-transitory computer-readable storage medium storing a computer-executable program of claim 11, wherein the method further comprises the steps of:
by the preview unit, reflecting the print settings in job setting information of the preview job in response to a change of the print settings made after previewing, and transmitting the print instruction to the printer driver unit; and
by the printer driver unit, generating difference PDL commands and transmitting the generated difference PDL commands to the printer.

* * * * *